United States Patent
Sano et al.

(10) Patent No.: US 8,941,829 B2
(45) Date of Patent: Jan. 27, 2015

(54) SPECTRAL CHARACTERISTIC MEASUREMENT METHOD AND SPECTRAL CHARACTERISTIC MEASUREMENT APPARATUS THAT CORRECTS FOR STRAY LIGHT

(75) Inventors: Hiroyuki Sano, Konan (JP); Kunikazu Taguchi, Hirakata (JP)

(73) Assignee: Otsuka Electronics Co., Ltd., Hirakata-Shi (JP)

( * ) Notice: Subject to any disclaimer, the term of this patent is extended or adjusted under 35 U.S.C. 154(b) by 286 days.

(21) Appl. No.: 13/397,681

(22) Filed: Feb. 16, 2012

(65) Prior Publication Data

US 2012/0229803 A1    Sep. 13, 2012

(30) Foreign Application Priority Data

Mar. 10, 2011    (JP) .................................. 2011-053019

(51) Int. Cl.
*G01J 3/28*    (2006.01)
*G01J 3/02*    (2006.01)
*G01J 3/18*    (2006.01)

(52) U.S. Cl.
CPC ............... *G01J 3/0291* (2013.01); *G01J 3/18* (2013.01); *G01J 3/2803* (2013.01); *G01J 3/0218* (2013.01); *G01J 3/0262* (2013.01); *G01J 3/0232* (2013.01); *G01J 3/027* (2013.01)
USPC .......................................... 356/326; 356/300

(58) Field of Classification Search
CPC ..... G01J 3/0256; G01J 3/0259; G01J 3/0262; G01J 3/0272; G01J 3/0297; G01J 3/28; G01J 3/2803; G01J 3/2823
USPC ................................................. 356/300–334
See application file for complete search history.

(56) References Cited

U.S. PATENT DOCUMENTS

| | | | | |
|---|---|---|---|---|
| 4,526,470 A | * | 7/1985 | Kaye | ............................ 356/319 |
| 5,428,558 A | * | 6/1995 | Cahill et al. | ................. 356/319 |
| 5,801,829 A | * | 9/1998 | Mueller et al. | ............... 356/326 |
| 6,801,309 B1 | * | 10/2004 | Nelson | ......................... 356/307 |
| 2009/0059224 A1 | | 3/2009 | Imura | |

FOREIGN PATENT DOCUMENTS

| | | |
|---|---|---|
| JP | 11-030552 | 2/1990 |
| JP | H07-209082 | 8/1995 |
| JP | 2002-005741 | 1/2002 |
| JP | 2009-053060 | 3/2009 |
| JP | 2009-222690 | 10/2009 |
| JP | 2010-117343 | 5/2010 |

OTHER PUBLICATIONS

Japanese Office Action for corresponding JP Application No. 2011-053019, Sep. 30, 2014.

* cited by examiner

*Primary Examiner* — Tarifur Chowdhury
*Assistant Examiner* — Michael P Lapage
(74) *Attorney, Agent, or Firm* — Mori & Ward, LLP

(57) ABSTRACT

A spectral characteristic measurement method for measuring spectral characteristics of measured light with higher accuracy is provided. The spectral characteristic measurement method includes causing an optical measurement instrument having detection sensitivity in a first wavelength range to receive light in a second wavelength range which is a part of the first wavelength range, obtaining characteristic information indicating a stray light component from a portion of a first spectrum detected by the optical measurement instrument, that corresponds to a range other than the second wavelength range, and obtaining a pattern indicating a stray light component generated in the optical measurement instrument by subjecting the characteristic information to extrapolation processing as far as the second wavelength range in the first wavelength range.

6 Claims, 16 Drawing Sheets

FIG.12A

| 1ch | 0.95 |
|---|---|
| 2ch | 0.93 |
| ⟩ | ⟩ |
| Nch | 0.82 |

FIG.12B

| SIGNAL INTENSITY | 0.00080 |
|---|---|
| 1ch | 0.00072 |
| 2ch | 0.00070 |
| ⟩ | ⟩ |
| Nch | 0.000640 |

FIG.12C $$S(\lambda) = A \cdot \exp(B \cdot \lambda) + C$$

FIG.12D

| SIGNAL INTENSITY | 0.00080 |
|---|---|
| $s(\lambda) = a \cdot \exp(b \cdot \lambda) + c$ | |

SPECTRAL CHARACTERISTIC MEASUREMENT METHOD AND SPECTRAL CHARACTERISTIC MEASUREMENT APPARATUS THAT CORRECTS FOR STRAY LIGHT

BACKGROUND OF THE INVENTION

1. Field of the Invention

The present invention relates to a spectral characteristic measurement method and a spectral characteristic measurement apparatus for measuring spectral characteristics of measured light with higher accuracy.

2. Description of the Background Art

Conventionally, spectrometry has widely been used as a technique for evaluating an illuminant and the like. In a spectral characteristic measurement apparatus used in such spectrometry, a spectrometer (typically, a diffraction grating) is generally used to split measured light from an illuminant or the like, which is a measurement target, into a plurality of components and to detect each resultant component with a photodetector. In order to minimize influence of light other than light to be measured, the spectrometer and the photodetector are accommodated in a housing.

Actually, however, a result of detection by the photodetector may be affected by irregularly reflected light in the housing, light reflected in a diffused manner at a surface of the spectrometer, light having an order other than a measurement order, and the like. In general, such light is referred to as "stray light". Various methods have been proposed in order to suppress influence of such unintended stray light.

For example, Japanese Patent Laying-Open No. 11-030552 discloses a method of correcting stray light by accurately estimating influence of the stray light generated in measurement of light guided from a dispersion optical system of a spectrophotometer with a light receiver having a large number of light-receiving elements as a measurement constant of the spectrophotometer and by eliminating that influence.

In addition, Japanese Patent Laying-Open No. 2002-005741 discloses a spectrum measurement apparatus capable of obtaining an accurate spectrum intensity signal by eliminating influence of stray light generated within the spectrum measurement apparatus or unnecessary light generated by reflection or diffraction at a surface of a detection element through processing of a detection signal.

Further, Japanese Patent Laying-Open No. 2010-117343 discloses an optical characteristic measurement apparatus for measuring a spectrum in a shorter period of time with higher accuracy by calculating a correction value based on signal intensity detected in a correction area (an area where light split by a spectrometer is not incident) and calculating a corrected measurement spectrum by subtracting the calculated correction value from each component value included in a measurement spectrum detected in a detection area (an area corresponding to a surface on which light from the spectrometer is incident).

Furthermore, Japanese Patent Laying-Open No. 2009-222690 discloses an inexpensive optical measurement instrument capable of removing stray light from measurement data.

SUMMARY OF THE INVENTION

The present invention was made to solve such a problem, and an object of the present invention is to provide a spectral characteristic measurement method and a spectral characteristic measurement apparatus capable of measuring spectral characteristics of measured light in a shorter period of time with high accuracy.

A spectral characteristic measurement method according to one aspect of the present invention includes causing an optical measurement instrument having detection sensitivity in a first wavelength range to receive light in a second wavelength range which is a part of the first wavelength range, obtaining characteristic information indicating a stray light component from a portion of a first spectrum detected by the optical measurement instrument, that corresponds to a range other than the second wavelength range, and obtaining a pattern indicating a stray light component generated in the optical measurement instrument by subjecting the characteristic information to extrapolation processing as far as the second wavelength range in the first wavelength range.

Preferably, the spectral characteristic measurement method further includes determining a third spectrum indicating spectral characteristics of measured light by correcting, by using the pattern, a second spectrum detected when the measured light enters the optical measurement instrument.

More preferably, the optical measurement instrument includes a photodetector for receiving incident light, and the photodetector has a detection surface constituted of a first detection area designed such that light in the first wavelength range is incident and a second detection area other than the first detection area. The spectral characteristic measurement method further includes obtaining signal intensity detected in the second detection area in detecting the second spectrum. The step of determining a third spectrum includes correcting the pattern based on the signal intensity and determining the third spectrum by subtracting the corrected pattern from the second spectrum.

More preferably, the second detection area is provided on a shorter wavelength side continuing from the first detection area.

Alternatively, more preferably, the second detection area includes a plurality of detection elements, and the signal intensity is an average value of signal intensities detected by the plurality of detection elements.

Preferably, the step of obtaining a pattern includes determining an exponential function for approximating the obtained characteristic information.

A spectral characteristic measurement apparatus according to another aspect of this invention includes an optical measurement portion having detection sensitivity in a first wavelength range, a storage portion configured to store a pattern indicating a stray light component generated in the optical measurement portion, and a correction portion configured to determine a spectrum indicating spectral characteristics of measured light by correcting, by using the pattern, a spectrum detected by causing the measured light to enter the optical measurement portion. The pattern is any of an approximate function determined based on characteristic information indicating the stray light component obtained with regard to a range other than a second wavelength range which is a part of the first wavelength range and a data set indicating the approximate function.

Preferably, the approximate function is an exponential function.

Preferably, the optical measurement portion includes a photodetector receiving incident light, and the photodetector has a detection surface constituted of a first detection area designed such that light in the first wavelength range is incident and a second detection area other than the first detection area. The correction portion is configured to obtain signal intensity detected in the second detection area in detecting a spectrum as the measured light is incident, correct the pattern based on the obtained signal intensity, and determine a spectrum indicating spectral characteristics of the measured light by subtracting the corrected pattern from the detected spectrum.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 12A to 12D are each a schematic diagram showing one example of a data structure of a stray light pattern stored in the spectral characteristic measurement apparatus according to the embodiment of the present invention.

DESCRIPTION OF THE PREFERRED EMBODIMENTS

Figure 1:
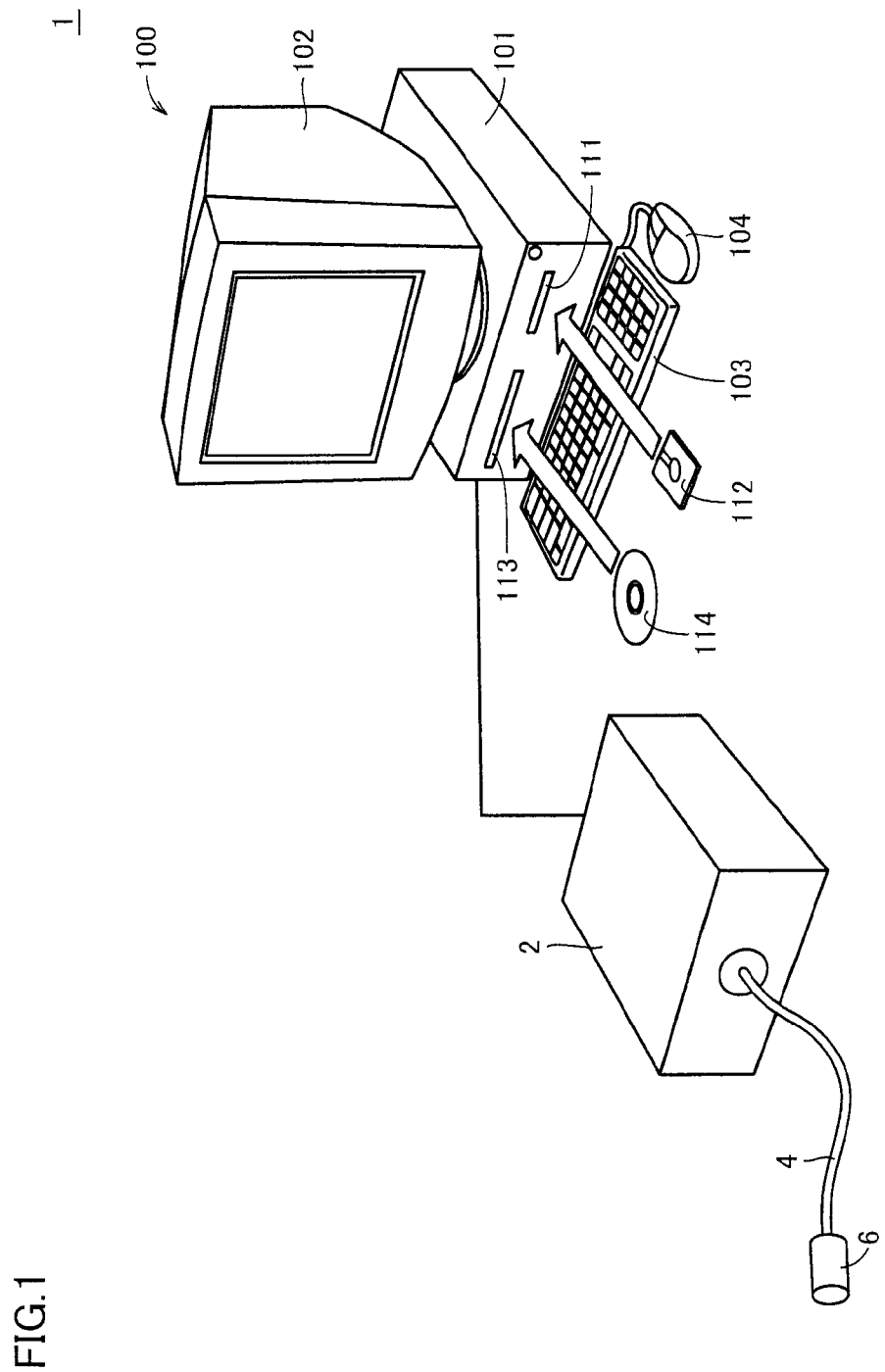
FIG. 1 is an external view of a spectral characteristic measurement apparatus according to an embodiment of the present invention.

An embodiment of the present invention will be described in detail with reference to the drawings. The same or corresponding elements in the drawings have the same reference characters allotted and description thereof will not be repeated.

<A. Overall Configuration of Apparatus>

Referring to FIG. 1, an overall configuration of a spectral characteristic measurement apparatus 1 according to an embodiment of the present invention will be described. Spectral characteristic measurement apparatus 1 measures spectral characteristics (spectrum) of various illuminants (hereinafter also referred to as an "object"). Spectral characteristic measurement apparatus 1 may calculate such optical characteristics as brightness and tint of the object based on the measurement spectrum. It is noted that brightness refers to luminance, luminous intensity and the like of the object, and tint refers to a chromaticity coordinate, a dominant wavelength, excitation purity, a correlated color temperature, and the like of the object. Spectral characteristic measurement apparatus 1 is applicable to measurement for a light emitting diode (LED), a flat panel display (FPD), and the like.

Spectral characteristic measurement apparatus 1 includes an optical measurement instrument main body (hereinafter, referred to as a "measurement instrument main body") 2 and a processing device 100. A light reception portion 6 is connected to measurement instrument main body 2 through an optical fiber 4. Light emitted from the object and taken in from light reception portion 6 (hereinafter also referred to as "measured light") is guided to measurement instrument main body 2 through optical fiber 4.

As will be described later, measurement instrument main body 2 splits the measured light that enters measurement instrument main body 2 from the object and outputs a result of detection in accordance with intensity of each component included therein (signal intensity) to processing device 100. As will be described later, measurement instrument main body 2 contains a spectrometer for splitting measured light and a photodetector for receiving light split by the spectrometer.

Spectral characteristic measurement apparatus 1 has a pattern obtained in advance, which indicates an error component originating from stray light (hereinafter also referred to as a "stray light pattern"), and it corrects this stray light pattern in accordance with a situation at the time of each measurement and determines (or estimates) a spectrum indicating stray light (hereinafter also referred to as a "stray light spectrum") in each situation. This stray light spectrum indicates an error component originating from stray light. By correcting a measured spectrum (hereinafter also referred to as a "measurement spectrum") with this estimated stray light spectrum, a measurement result from which error originating from stray light has been excluded is obtained. Spectral characteristic measurement apparatus 1 eliminates not only influence of such an error originating from stray light but also influence of an error originating from a dark current that flows in the photodetector.

<B. Configuration of Measurement Instrument Main Body>

Figure 2:
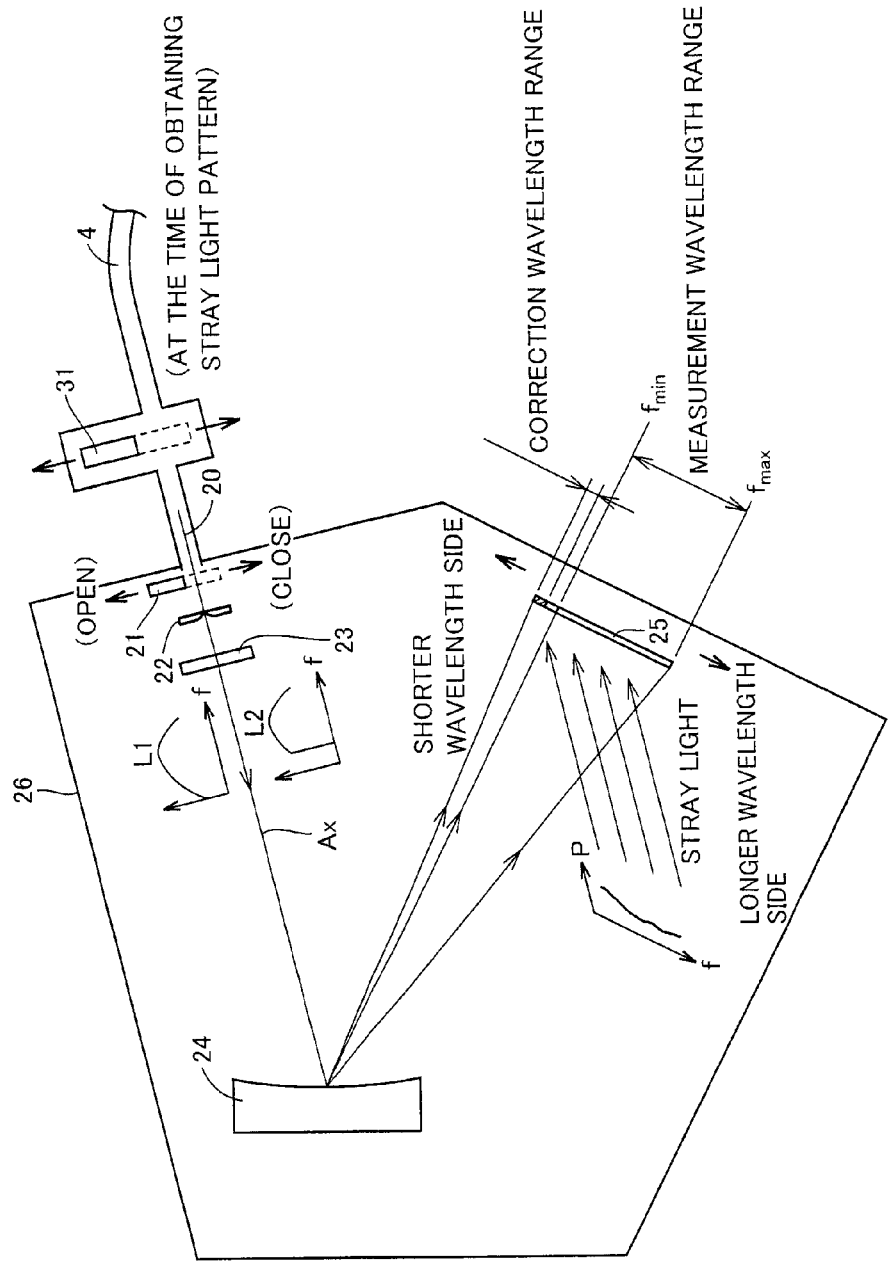
FIG. 2 is a schematic cross-sectional view of a measurement instrument main body according to the embodiment of the present invention.

FIG. 2 is a schematic cross-sectional view of measurement instrument main body 2. Referring to FIG. 2, measurement instrument main body 2 includes a shutter 21, a slit 22, a cut-off filter 23, a spectrometer 24, and a photodetector 25. These components are accommodated in a housing 26. A light input port 20 is formed in a part of housing 26. Light input port 20 is connected to optical fiber 4. The measured light guided by optical fiber 4 enters housing 26 and propagates along a prescribed optical axis Ax. Shutter 21, slit 22, cut-off filter 23, and spectrometer 24 are arranged along this optical axis Ax, sequentially from light input port 20. Namely, the measured light is incident on spectrometer 24 after it passes through slit 22 and cut-off filter 23.

Shutter 21 cuts off light that enters housing 26 from the outside of housing 26. Namely, shutter 21 establishes such a state that light does not enter housing 26, in order to obtain a spectrum serving as a calibration reference in photodetector 25 (hereinafter also referred to as a "dark spectrum"). For example, shutter 21 is structured such that it can be displaced in a direction perpendicular to optical axis Ax. Thus, when shutter 21 is located on optical axis Ax (hereinafter also referred to as a "close position"), light that enters housing 26 is cut off. It is noted that an operation for measuring a dark spectrum detected by photodetector 25 while the light that enters housing 26 is cut off is also referred to as "dark measurement". For distinction from this "dark measurement", an ordinary operation for measuring a spectrum of an object is also referred to as "ordinary measurement".

On the other hand, when shutter 21 is located at a position distant from optical axis Ax (hereinafter also referred to as an "open position"), the measured light enters housing 26. Though FIG. 2 illustrates arrangement where shutter 21 is provided inside housing 26, it may be provided outside housing 26. In addition, a mechanism of any type may be employed as a mechanism for cutting off measured light.

Spectrometer 24 is arranged on optical axis Ax and splits the measured light incident along optical axis Ax into a plurality of components at prescribed wavelength intervals. The light resulting from splitting by spectrometer 24 is guided to photodetector 25. For example, spectrometer 24 is implemented by a concave diffraction grating called blazed holographic type. This concave diffraction grating reflects incident measured light toward corresponding directions as diffraction light having prescribed wavelength intervals. Therefore, the light split by spectrometer 24 (diffraction light) is emitted toward photodetector 25 in a spatially spread manner.

Instead of the blazed holographic type concave diffraction grating described above, any diffraction grating such as a flat focus type concave diffraction grating may be adopted as spectrometer 24.

Photodetector 25 receives the measured light (diffraction light) split by spectrometer 24. Photodetector 25 detects an intensity of each component included in the received measured light. The intensity detected by photodetector 25 is brought in correspondence with each component. Accordingly, the detection signal from photodetector 25 corresponds to the spectrum of the measured light. Photodetector 25 is representatively implemented by a photodiode array (PDA), in which a plurality of detection elements such as photodiodes are arranged in an array. Alternatively, a charge coupled device (CCD) in which a plurality of detection elements such as photodiodes are arranged in matrix may be adopted. For example, photodetector 25 is configured to be able to output signals indicating intensities of 512 components (channels) in a range from 200 nm to 800 nm. In addition, photodetector 25 includes an A/D (Analog to Digital) converter and a peripheral circuit for outputting a signal indicating a detected light intensity as a digital signal.

In measurement instrument main body 2, spectrometer 24 and photodetector 25 are optically designed so as to guide a component in a range from a wavelength $f_{min}$ to a wavelength $f_{max}$ to spectrometer 24, of the incident measured light. Namely, a wavelength range (a measurement wavelength) for which measurement instrument main body 2 has detection sensitivity is in a range from wavelength $f_{min}$ to wavelength $f_{max}$.

Slit 22 adjusts a diameter of luminous flux (size) of the measured light in order to attain appropriate detection resolution. For example, each slit width of slit 22 is set approximately to 0.2 mm to 0.05 mm. The measured light after passing through slit 22 enters cut-off filter 23. It is noted that cut-off filter 23 is arranged at a position substantially corresponding to a focus position of the measured light after passing through slit 22.

Cut-off filter 23 is arranged on optical axis Ax, which is an optical path through which the measured light taken into housing 26 is incident on spectrometer 24. Cut-off filter 23 cuts off light having a wavelength shorter than a prescribed cut-off wavelength α among components included in this measured light. Namely, cut-off filter 23 allows transmission only of light having a wavelength longer than cut-off wavelength α. As will be described later, this cut-off wavelength α preferably matches with a lower limit value (wavelength $f_{min}$) of a measurement wavelength of measurement instrument main body 2.

FIG. 2 shows arrangement in which a cut-off filter 31 used for obtaining a stray light pattern is provided on the optical path of optical fiber 4. This cut-off filter 31 is a typical configuration example for allowing light having a component only in a part of the wavelength range (wavelength range $f_{min}$ to $f_{max}$) for which measurement instrument main body 2 has detection sensitivity to enter measurement instrument main body 2. Namely, cut-off filter 31 is a high-pass filter having a cut-off wavelength $f_{cut}$ ($f_{min} < f_{cut} < f_{max}$) and prevents a component shorter in wavelength than cut-off wavelength $f_{cut}$ from passing through. Therefore, as a result of presence of cut-off filter 31, light that enters measurement instrument main body 2 includes only a component longer than cut-off wavelength $f_{cut}$. It is noted that this cut-off filter 31 is required for obtaining a stray light pattern and it is not necessary to attach the cut-off filter during ordinary measurement.

<C. Overview of Correction Processing>

Processing for correcting an error in spectral characteristic measurement apparatus 1 will be described below. As shown in FIG. 2, when light enters housing 26 of measurement instrument main body 2, stray light may be generated. This stray light includes irregularly reflected light in housing 26, light reflected in a diffused manner at the surface of spectrometer 24, light having an order other than a measurement order generated in spectrometer 24, and the like. As such stray light is incident on photodetector 25, an error component may be caused in a result of detection by photodetector 25.

In addition, photodetector 25 is implemented by a semiconductor device such as a CCD, and a dark current flows when such a semiconductor device is driven. Due to this dark current as well, the result of detection by photodetector 25 may contain an error component (hereinafter also referred to as a "dark current spectrum"). Magnitude of the dark current is susceptible to an ambient temperature and it may fluctuate over time, depending on an environment for measurement.

Summarizing the above, the result of detection by photodetector 25 (the measurement spectrum) includes (1) an original spectrum of the measured light, (2) an error component (a stray light spectrum) originating from stray light generated within the housing, (3) an offset component caused by a dark current that flows in photodetector 25, and (4) other error components.

The inventors of the present application have conducted researches in particular on (2) an error component originating from stray light generated within the housing and consequently have found that a waveform in a wavelength region of an error component originating from stray light (a standardized stray light spectrum/stray light pattern) is not dependent on intensity (an absolute value) of stray light but substantially constant characteristics are maintained.

Then, in spectral characteristic measurement apparatus 1, a stray light pattern indicating a stray light component that would be generated in measurement instrument main body 2 is obtained in advance, and using this pattern, a stray light spectrum indicating a stray light component at the time of each measurement is dynamically generated (or estimated). Then, using this dynamically generated stray light spectrum, a measurement spectrum from photodetector 25 is corrected so that the original spectrum of measured light is more accurately determined.

(c1: Stray Light Pattern)

In the present embodiment, as a method of obtaining in advance such a stray light pattern, light having only a component in a part of a wavelength range for which measurement instrument main body 2 has detection sensitivity is caused to enter measurement instrument main body 2, and characteristic information indicating a stray light component is obtained from a portion of the measurement spectrum detected at that time, that corresponds to a wavelength range in which intensity of incident light should be zero.

Figure 3A:
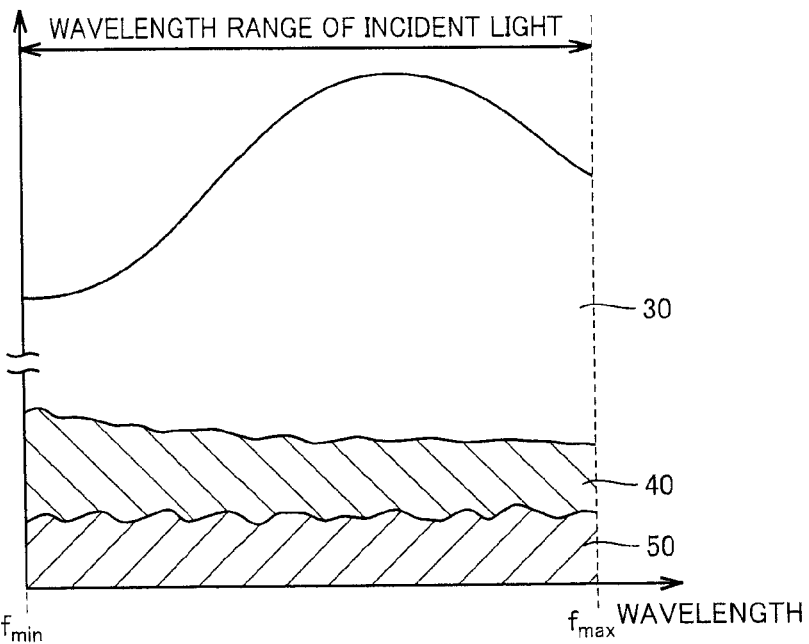
FIGS. 3A and 3B are each a conceptual diagram showing an exemplary detection result output from a photodetector in the spectral characteristic measurement apparatus according to the embodiment of the present invention.
Figure 3B:
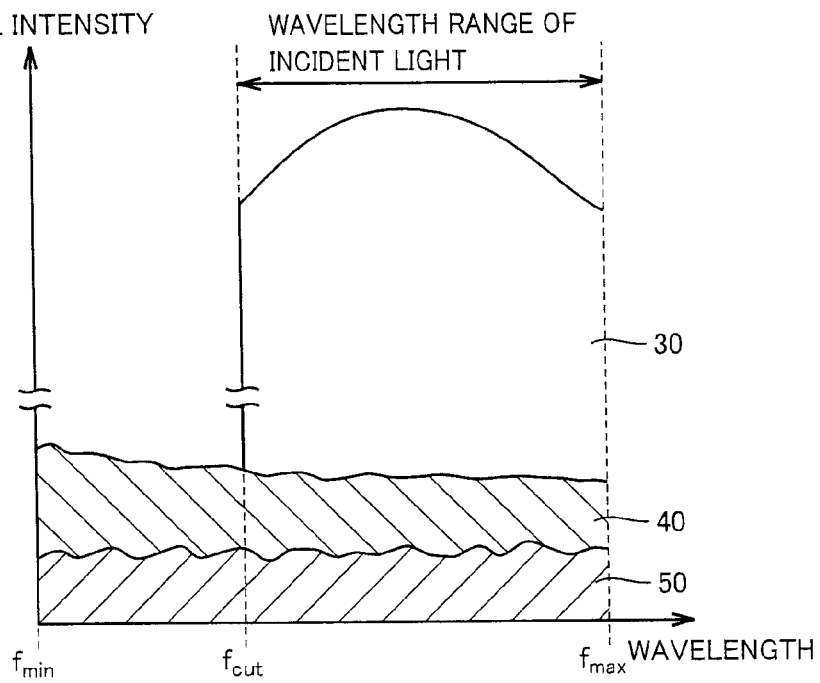

FIGS. 3A and 3B are each a conceptual diagram showing one example of a detection result output from photodetector 25 in spectral characteristic measurement apparatus 1. More specifically, FIG. 3A shows an example of a case where light having a component in a measurement wavelength of measurement instrument main body 2 (a wavelength range from $f_{min}$ to $f_{max}$) enters measurement instrument main body 2, and FIG. 3B shows an example in a case where light having only a component in a part of the measurement wavelength of measurement instrument main body 2 (a wavelength range from $f_{cut}$ to $f_{max}$) enters measurement instrument main body 2.

Referring to FIG. 3A, a result of detection (a measurement spectrum) from photodetector 25 includes not only an original spectrum 30 of incident light but also a stray light spectrum 40 originating from stray light, a dark current spectrum 50 originating from a dark current that flows in photodetector 25, and not-shown other error components.

In contrast, as shown in FIG. 3B, when light having only a component in the wavelength range from $f_{cut}$ to $f_{max}$ enters measurement instrument main body 2, a portion of the measurement spectrum in a wavelength range from $f_{min}$ to $f_{cut}$ where no component of incident light is present (that is, intensity is zero) basically reflects only stray light spectrum 40 and dark current spectrum 50. Therefore, characteristic information indicating a stray light component can be obtained from a characteristic value of a portion of the measurement spectrum, that corresponds to the wavelength range where no component of incident light is present.

It is noted that dark current spectrum 50 (and other error components) can be measured by driving shutter 21 (FIG. 2) to the close position so as to cut off light that enters housing 26. Namely, in a state of dark measurement, since no stray light component is basically present in housing 26, a spectrum measured here (dark spectrum) reflects dark current spectrum 50 and other error components.

Therefore, a portion in the wavelength range from $f_{min}$ to $f_{cut}$ where intensity of incident light is zero, in a spectrum obtained by subtracting the dark spectrum from the measurement spectrum measured when light having only a component in the wavelength range from $f_{cut}$ to $f_{max}$ is caused to enter measurement instrument main body 2, indicates characteristic information only on the stray light component (stray light spectrum 40).

Various methods are available as a method of generating light having intensity in a partial wavelength range in the wavelength range for which measurement instrument main body 2 has detection sensitivity. Typically, a method of combining light from a light source having a prescribed emission spectrum and a wavelength filter (cut-off filter 31) with each other as described with reference to FIG. 2 can be adopted. In the description below, a method of obtaining a stray light pattern using this cut-off filter 31 will be described. It is noted that the present invention is not limited to this method.

As an alternative method, a semiconductor light-emitting device such as laser or an LED may be employed. Such a semiconductor device emits light having a specific wavelength or in a prescribed wavelength range, and hence light having intensity of zero in a partial wavelength range of the wavelength range for which measurement instrument main body 2 has detection sensitivity can be caused to enter.

(c2: Extrapolation Processing)

As shown in FIGS. 3A and 3B, in a case where a stray light pattern with regard to a partial wavelength range of the wavelength range for which measurement instrument main body 2 has detection sensitivity is obtained by using cut-off filter 31 as described above, a stray light pattern in other wavelength ranges will be missed.

Then, in the present embodiment, a stray light pattern obtained with regard to a wavelength range where intensity of incident light is zero is subjected to extrapolation processing, so that the stray light pattern is expanded to a full wavelength range for which measurement instrument main body 2 has detection sensitivity. A known technique can be adopted for such extrapolation processing.

More specifically, initially, a stray light pattern obtained in the wavelength range where intensity of incident light is zero (the wavelength range from $f_{min}$ to $f_{cut}$ shown in FIG. 3B) is subjected to interpolation processing, so that characteristic information (wavelength-signal intensity characteristics) is obtained. Here, an exponential function is preferably adopted as the characteristic information. For example, such a function as $S(\lambda)=A \cdot \exp(B \cdot \lambda)+C$ (where A, B, and C are constants) can be adopted as such an exponential function.

Then, this obtained characteristic information (the exponential function) is subjected to extrapolation processing with regard to the wavelength range from $f_{cut}$ to $f_{max}$, so that a stray light pattern with regard to the wavelength range from $f_{min}$ to $f_{max}$ for which measurement instrument main body 2 has detection sensitivity can be obtained. When a stray light pattern is fitted by using an exponential function as described above, a stray light pattern also in the wavelength range from $f_{min}$ to $f_{max}$ may be defined in a form of an exponential function.

It is noted that any function can be used for a function to be used for interpolation processing (specifically, fitting processing) for this stray light pattern. For example, a high-degree equation, a log-log equation, or the like can also be adopted. According to a measurement example shown in FIG. 13 which will be described later, it can also be said that such a function that an amplitude thereof lowers toward a longer wavelength is preferably used.

No problem arises if a cut-off filter has ideal cut-off characteristics, however, actually, cut-off of light may be insufficient in the vicinity of a cut-off wavelength (an amount of attenuation may be insufficient), and hence data of a wavelength distant to some extent from the cut-off wavelength is preferably used for interpolation processing.

(c3: Amplitude Correction)

An amplitude of stray light spectrum 40 included in the measurement result may vary, depending on a quantity of light that enters measurement instrument main body 2 or the like. Then, in spectral characteristic measurement apparatus 1, an area where diffraction light from spectrometer 24 is incident and an area where the diffraction light is not incident are provided in a detection surface of photodetector 25. Spectral characteristic measurement apparatus 1 corrects an amplitude of the stray light spectrum based on signal intensity detected in the area where diffraction light is not incident.

Figure 4:
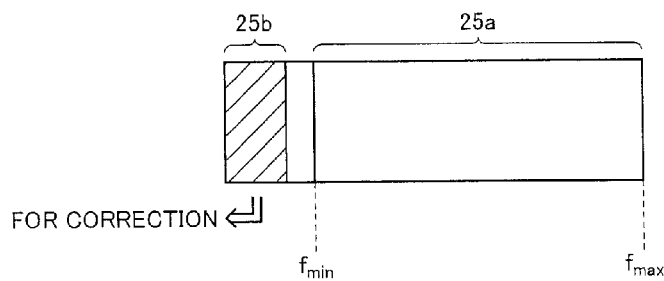
FIG. 4 is a schematic diagram showing a detection surface of the photodetector contained in the measurement instrument main body according to the embodiment of the present invention.
Figure 5:
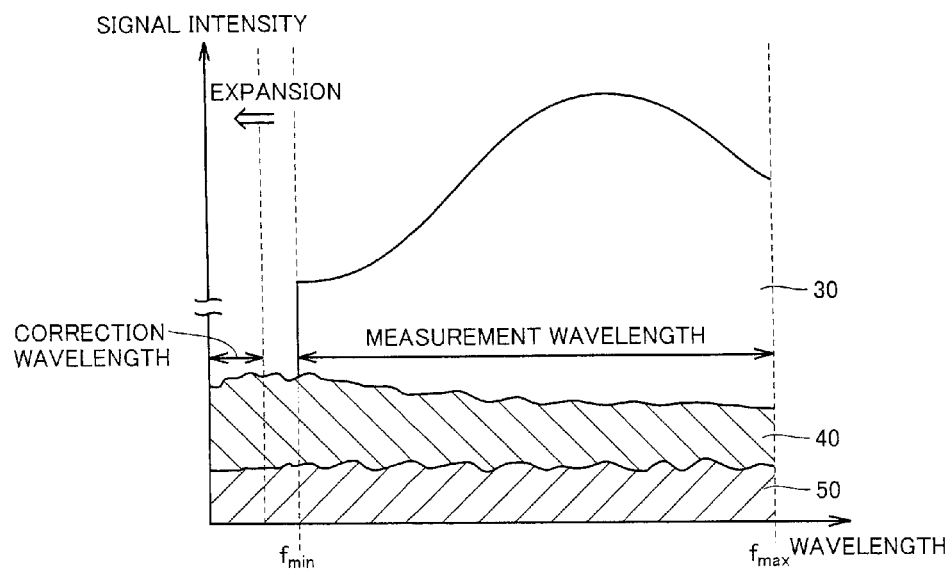
FIG. 5 is a schematic diagram illustrating a spectrum detected by the photodetector shown in FIG. 4.

FIG. 4 is a schematic diagram showing a detection surface of photodetector 25 contained in measurement instrument main body 2. FIG. 5 is a schematic diagram illustrating a spectrum detected by photodetector 25 shown in FIG. 4.

Referring to FIG. 4, photodetector 25 includes as its detection surface, a detection area 25a where diffraction light from spectrometer 24 is incident and a correction area 25b where the diffraction light is not incident. More specifically, detection area 25a is designed such that a component in a measurement wavelength (the wavelength range from $f_{min}$ to $f_{max}$) is incident. In contrast, correction area 25b is designed such that a component in a prescribed range on a short wavelength side (hereinafter also referred to as a "correction wavelength") continuing from detection area 25a is incident.

Cut-off filter 23 (FIG. 2) described above also functions not to cause an error in signal intensity detected in correction area 25b. Namely, as cut-off wavelength $\alpha$ of cut-off filter 23 is set to match with wavelength $f_{min}$, a component wavelength shorter than wavelength $f_{min}$ (cut-off wavelength $\alpha$) can be prevented from entering correction area 25b.

Though design may be such that all components on a shorter wavelength side than wavelength $f_{min}$ enter correction area 25b, detection area 25a and correction area 25b are preferably distant from each other by a prescribed wavelength width (a distance), from a point of view of avoiding influence of measured light.

Stray light generated in housing 26 may fluctuate, depending on a quantity of light that enters measurement instrument main body 2 or the like, however, it can be regarded as sufficiently diffusing in housing 26. Referring to FIG. 5, signal intensity detected in detection area 25a and signal intensity detected in correction area 25b can be regarded as satisfying proportional relation.

Therefore, when a stray light pattern is obtained, signal intensity that has been detected in correction area 25b is stored in association with the stray light pattern and an amplitude of the stray light pattern is corrected by using signal intensity detected in correction area 25b at the time of each measurement. Then, a stray light spectrum in accordance with a situation at the time of measurement can be estimated.

Correction area 25b is preferably set to include a plurality of detection elements, and in this case, a plurality of signal intensities can be detected. Here, a representative value of a plurality of signal intensities detected by the respective detection elements (typically, an average value or a median value) is preferably used as the signal intensity.

Thus, the stray light spectrum is dynamically generated by correcting the stray light pattern obtained in advance based on signal intensity detected in correction area 25b. Since a state of stray light does not have to actually be measured for each measurement, a time period required for measurement can be reduced and a measurement result in consideration of a stray light spectrum in accordance with a situation for each measurement can be obtained. Thus, measurement can be more accurate.

<D. Configuration of Processing Device>

Referring again to FIG. 1, processing device 100 is representatively implemented by a computer. More specifically, processing device 100 includes a computer main body 101 incorporating an FD (Flexible Disk) drive 111 and a CD-ROM (Compact Disk-Read Only Memory) drive 113, a monitor 102, a keyboard 103, and a mouse 104. As computer main body 101 executes a program stored in advance, the correction processing described above is provided.

Figure 6:
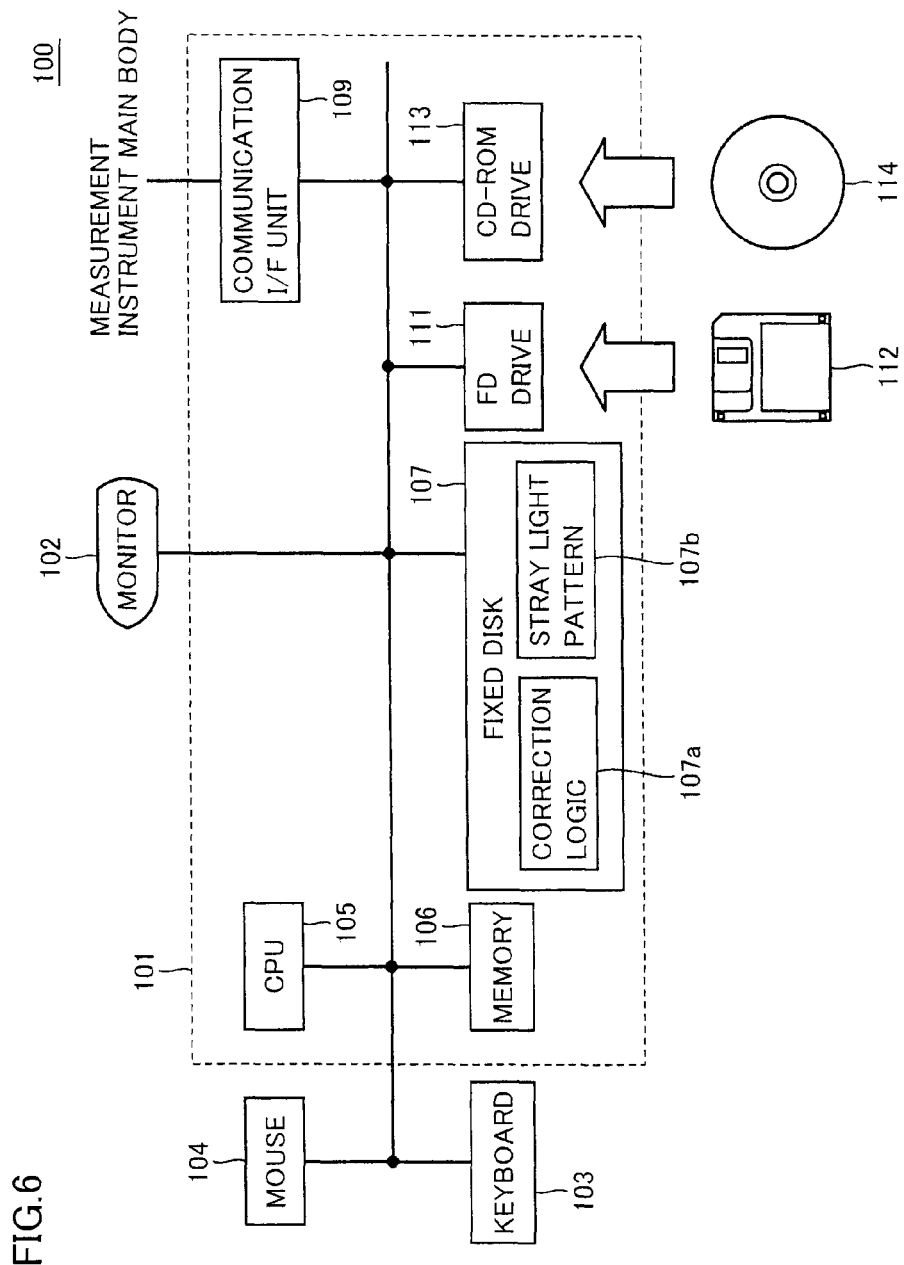
FIG. 6 is a schematic configuration diagram showing a hardware configuration of a processing device according to the embodiment of the present invention.

FIG. 6 is a schematic configuration diagram showing a hardware configuration of processing device 100. Referring to FIG. 6, computer main body 101 includes, in addition to FD drive 111 and CD-ROM drive 113 shown in FIG. 1, a CPU (Central Processing Unit) 105, a memory 106, a fixed disk 107, and a communication interface (I/F) unit 109, that are connected to each other through a bus.

An FD 112 is attachable to FD drive 111, and a CD-ROM 114 is attachable to CD-ROM drive 113. Processing device 100 is typically implemented by execution of a program by CPU 105 using computer hardware such as memory 106. In general, such a program is distributed as it is stored in a non-transitory computer-readable storage medium such as FD 112 or CD-ROM 114 or through a network or the like. Such a program is then read from a storage medium by means of FD drive 111, CD-ROM drive 113, or the like and once stored in fixed disk 107 representing a storage device. In addition, the program is read from fixed disk 107 to memory 106 and executed by CPU 105.

Fixed disk 107 stores in particular, a correction logic 107a for realizing correction processing according to the present embodiment and a stray light pattern 107b obtained in advance, to be used for correction. Correction logic 107a is typically embodied as a program (instruction codes) executable by CPU 105. Any data structure can be adopted for stray light pattern 107b (details of which will be described later).

CPU 105 serves as an operation processing unit for performing prescribed operations by sequentially executing various programs including correction logic 107a. Memory 106 temporarily stores various types of information as CPU 105 executes the program.

Communication interface unit 109 is a device for mediating data communication between computer main body 101 and measurement instrument main body 2 (FIG. 1). Specifically, communication interface unit 109 receives an electric signal indicating measurement data transmitted from measurement instrument main body 2 and converts the signal into a data format adapted to processing by CPU 105, and converts instructions or the like output by CPU 105 into an electric signal and sends the signal to measurement instrument main body 2.

Monitor 102 connected to computer main body 101 is a display device for displaying a calculation result such as brightness or tint of the object that is calculated by CPU 105, and it is implemented, for example, by a liquid crystal display (LCD) or a cathode ray tube (CRT).

Mouse 104 accepts an instruction from a user through an operation such as clicking or sliding. Keyboard 103 accepts an instruction from a user in accordance with an input key.

Other output devices such as a printer may be connected to computer main body 101 as necessary.

Correction processing according to the present embodiment may be realized in its entirety or in part by using a dedicated processor, an IC (integrated circuit), or the like, instead of such a form that correction processing is provided as CPU 105 as described above executes a program. Alternatively, correction processing may be realized by using a dedicated LSI (Large Scale Integration).

<E. Measurement Procedure>

(e1: Overview)

A measurement procedure according to the present embodiment is broadly categorized into (1) processing involved with obtaining a stray light pattern (a pre-process) and (2) correction processing including dark correction and stray light correction during ordinary measurement. Details of each processing will be described below.

It is noted that, in an actual manner of performing the processing, in a preliminary stage of shipment of a spectral characteristic measurement apparatus from a manufacturer, processing involved with obtaining a stray light pattern is performed to incorporate the obtained stray light pattern (and relevant parameters) into the spectral characteristic measurement apparatus (stray light pattern 107b in FIG. 6). Then, at the time of ordinary measurement, such a manner that stray light correction is carried out in the spectral characteristic measurement apparatus without user's awareness of such correction using a stray light pattern is assumed as most general.

(e2: Obtainment of Stray Light Pattern (Pre-Process))

Figure 7:
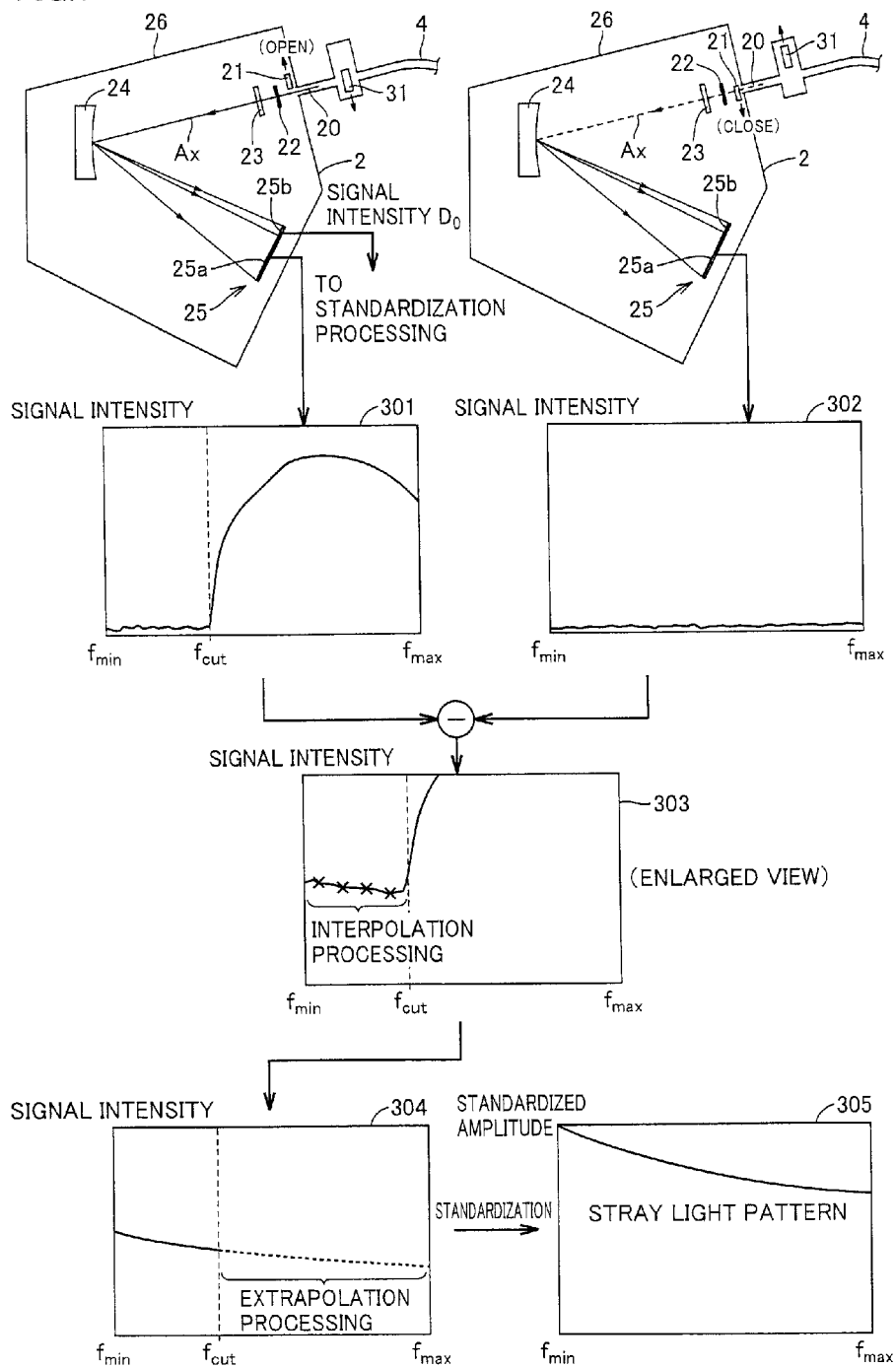
FIG. 7 is a diagram schematically showing processing contents involved with obtaining a stray light pattern according to the embodiment of the present invention.

FIG. 7 is a diagram schematically showing processing contents involved with obtaining a stray light pattern according to the embodiment of the present invention. Referring to FIG. 7, in processing for obtaining a stray light pattern according to the present embodiment, light of which component not higher than the cut-off wavelength $f_{cut}$ has been cut off by using cut-off filter 31 is generated, and a measurement spectrum 301 detected while this light is caused to enter measurement instrument main body 2 is obtained. In addition, a measurement spectrum (dark spectrum) 302 detected while shutter 21 is driven to the close position and light does not enter measurement instrument main body 2 is obtained. Then, a spectrum 303 indicating a stray light component is obtained by subtracting measurement spectrum 302 from measurement spectrum 301 (by carrying out dark correction).

A component of this spectrum 303 not higher than the cut-off wavelength $f_{cut}$ is subjected to interpolation processing, to thereby obtain characteristic information 304 indicating the stray light component. In addition, the obtained characteristic information 304 is subjected to extrapolation processing, to thereby obtain a stray light spectrum (stray light pattern) 305 as far as a wavelength range longer than cut-off wavelength $f_{cut}$. Here, at the time of measurement of measurement spectrum 301, standardization may be carried out by using a simultaneously measured signal intensity $D_0$. By thus standardizing the stray light spectrum (defining an amplitude of each component in the stray light pattern as a standardized amplitude (taking a value in a range from 0 to 1)), correction processing in ordinary measurement can further be simplified.

Figure 8:
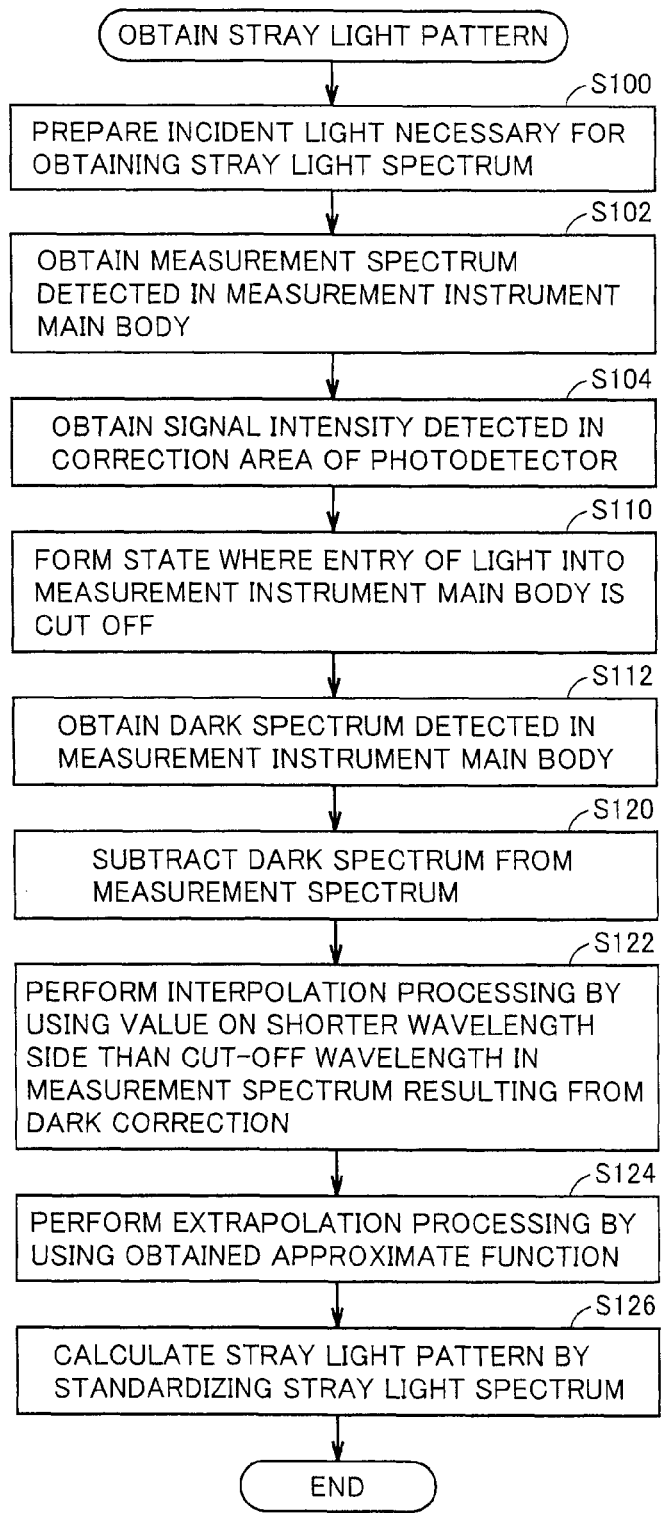
FIG. 8 is a flowchart showing a procedure involved with obtaining a stray light pattern according to the embodiment of the present invention.

FIG. 8 is a flowchart showing a procedure involved with obtaining a stray light pattern according to the embodiment of the present invention. Referring to FIG. 8, initially, processing for obtaining a measurement spectrum corresponding to a stray light pattern shown in steps S100 to S104 is performed. Namely, a user prepares incident light necessary for obtaining a stray light spectrum (step S100).

More specifically, cut-off filter 31 (FIG. 2) is arranged on the optical path of optical fiber 4 so as to cut off a component among components of light that enters measurement instrument main body 2, of which wavelength is shorter than cut-off wavelength $f_{cut}$. Alternatively, a semiconductor light-emitting device such as laser or an LED, capable of producing light having non-zero intensity only in a partial region of the wavelength range for which measurement instrument main body 2 has detection sensitivity and having zero intensity in other regions of the wavelength range for which it has detection sensitivity, is connected to light reception portion 6 (FIG. 1). In such a state, processing device 100 obtains a measurement spectrum detected in measurement instrument main body 2 (step S102). Namely, the spectral characteristic measurement method according to the present embodiment includes the step of causing light in a second wavelength range (from $f_{cut}$ to $f_{max}$) which is a part of a first wavelength range to enter the optical measurement instrument (measurement instrument main body 2) having detection sensitivity in the first wavelength range (from $f_{min}$ to $f_{max}$). In this state, the measurement spectrum is obtained.

In addition, processing device 100 obtains signal intensity detected in correction area 25b of photodetector 25 at the time when the measurement spectrum is obtained in step S102 (step S104). Signal intensity obtained in this step S104 is used in standardization processing which will be described later. Signal intensity obtained in step S104 is preferably an average value of a plurality of signal intensities detected in correction area 25b.

In succession, processing for obtaining a dark spectrum in steps S110 and S112 is performed. Namely, such a state that shutter 21 is driven to the close position and entry of light into measurement instrument main body 2 is cut off is formed (step S110). In this state, processing device 100 obtains a dark spectrum detected in measurement instrument main body 2 (step S112).

It is noted that any of the processing for obtaining a measurement spectrum shown in steps S100 to S104 described above and the processing for obtaining a dark spectrum shown in steps S110 to S112 may be performed first. Two of the measurement spectrum reflecting the stray light component and the dark spectrum should only finally be obtained and an order of performing processing is not restricted.

In succession, processing for calculating a stray light pattern shown in steps S120 to S126 is performed. Namely, processing device 100 subtracts the measurement spectrum obtained in step S112 (the dark spectrum) from the measurement spectrum obtained in step S102. It is noted that this subtraction processing is performed in such a manner that subtraction between two components for each corresponding wavelength is carried out.

Processing device 100 performs interpolation processing by using a value on a shorter wavelength side than cut-off wavelength $f_{cut}$ of cut-off filter 31, in the measurement spectrum resulting from dark correction, that has been obtained through subtraction processing (step S122). More specifically, a value on the shorter wavelength side than cut-off wavelength $f_{cut}$ of cut-off filter 31 is subjected to function approximation (fitting processing) by using an exponential function or the like. Then, based on actually measured information, an approximate function indicating a stray light spectrum is obtained. Namely, the spectral characteristic measurement method according to the present embodiment includes the step of obtaining characteristic information indicating a stray light component from a portion corresponding to a range other than the second wavelength range, in the first spectrum (the measurement spectrum resulting from dark correction) detected by the optical measurement instrument (measurement instrument main body 2).

In succession, processing device 100 performs extrapolation processing by using the approximate function obtained in step S122 (step S124). Namely, the approximate function obtained in step S122 is expanded to a wavelength range on the shorter wavelength side than cut-off wavelength $f_{cut}$ of cut-off filter 31, and a stray light spectrum over the entire wavelength range (the wavelength range from $f_{min}$ to $f_{max}$) for which measurement instrument main body 2 has detection sensitivity is calculated. Namely, the spectral characteristic measurement method according to the present embodiment includes the step of obtaining a pattern indicating a stray light component (a stray light pattern) generated in the optical measurement instrument (measurement instrument main body 2) by subjecting the characteristic information indicating the stray light component to extrapolation processing as far as the second wavelength range (from $f_{cut}$ to $f_{max}$) in the first wavelength range (from $f_{min}$ to $f_{max}$). Here, the step of obtaining a pattern includes the step of determining an exponential function for approximating the characteristic information indicating the obtained stray light component.

In addition, processing device 100 calculates a stray light pattern by standardizing the stray light spectrum obtained in step S124 by using the signal intensity obtained in step S104 and detected in correction area 25b of photodetector 25 (step S126). This standardization processing allocates an amplitude of each component included in the stray light pattern to a value in a prescribed range (typically, a range from 0 to 1), in order to dynamically generate the stray light spectrum for subjecting the measurement spectrum obtained in ordinary measurement which will be described later to stray light correction. More specifically, processing device 100 calculates an amplitude for each unit signal intensity detected in correction area 25b by dividing each component of the stray light spectrum obtained in step S124 by signal intensity obtained in step S104 and detected in correction area 25b.

The stray light pattern obtained as above is typically stored in processing device 100 of spectral characteristic measurement apparatus 1.

(e3: Dark Correction/Stray Light Correction (Ordinary Measurement))

Figure 9:
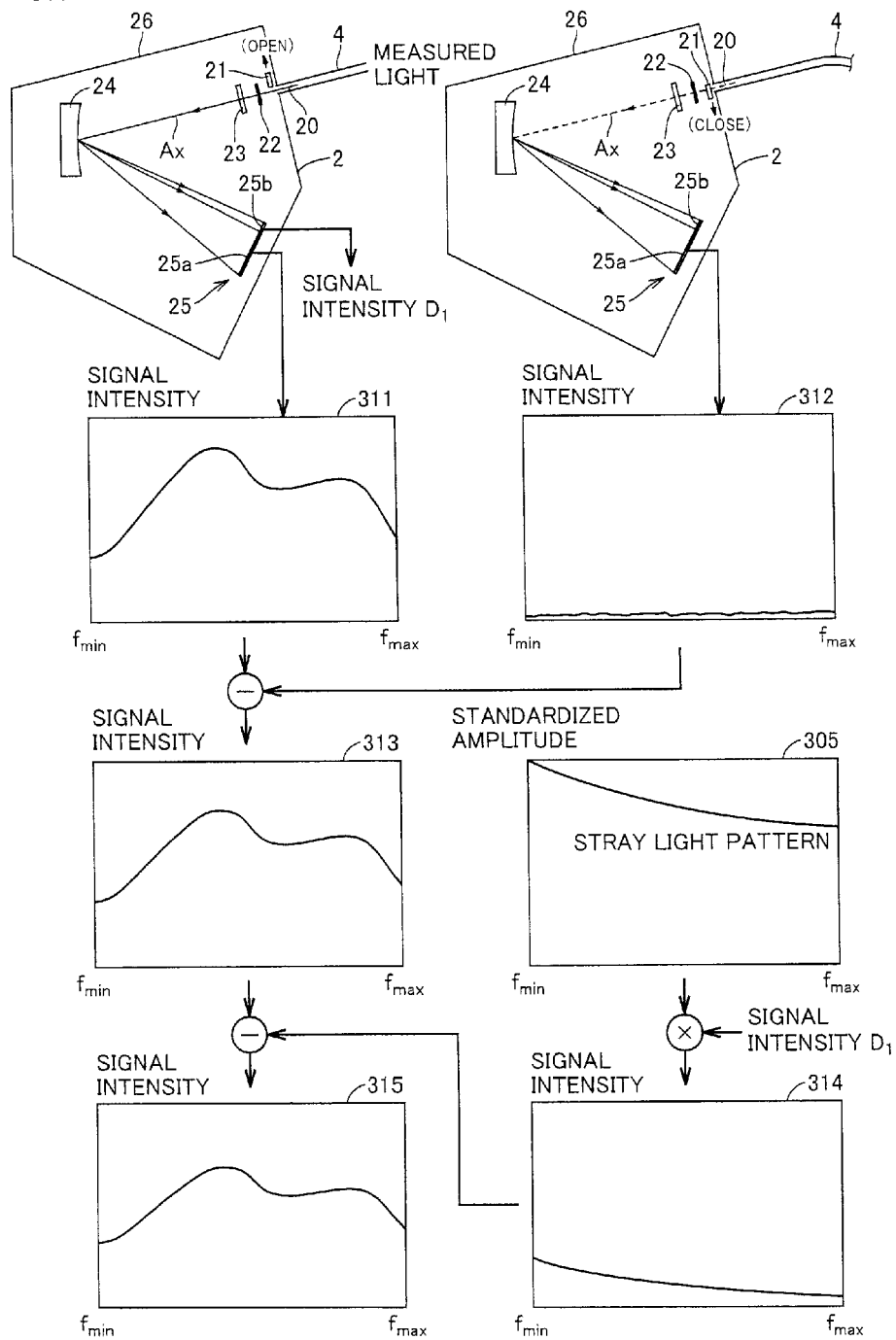
FIG. 9 is a diagram schematically showing processing contents involved with correction processing including dark correction and stray light correction during ordinary measurement according to the embodiment of the present invention.

FIG. 9 is a diagram schematically showing processing contents involved with correction processing including dark correction and stray light correction during ordinary measurement according to the embodiment of the present invention. Referring to FIG. 9, a measurement spectrum 311 detected while measured light from an object is caused to enter measurement instrument main body 2 is obtained. In addition, a measurement spectrum (dark spectrum) 312 detected while shutter 21 is driven to the close position and light does not enter measurement instrument main body 2 is obtained. Then, by subtracting measurement spectrum 312 from measurement spectrum 311, initially, a spectrum 313 resulting from dark correction is obtained.

On the other hand, a signal intensity $D_1$ measured simultaneously with measurement of measurement spectrum 311 is used to correct stray light pattern 305 obtained in advance, to thereby determine (or estimate) a stray light spectrum 314. As described above, in a case where standardized stray light pattern 305 has been obtained in advance, stray light spectrum 314 can be determined by multiplying each component of stray light pattern 305 by an absolute value of signal intensity $D_1$. Then, by subtracting determined stray light spectrum 314 from spectrum 313 resulting from dark correction, a spectrum 315 indicating original spectral characteristics of the object is obtained. This spectrum 315 is output as a measurement result.

Figure 10:
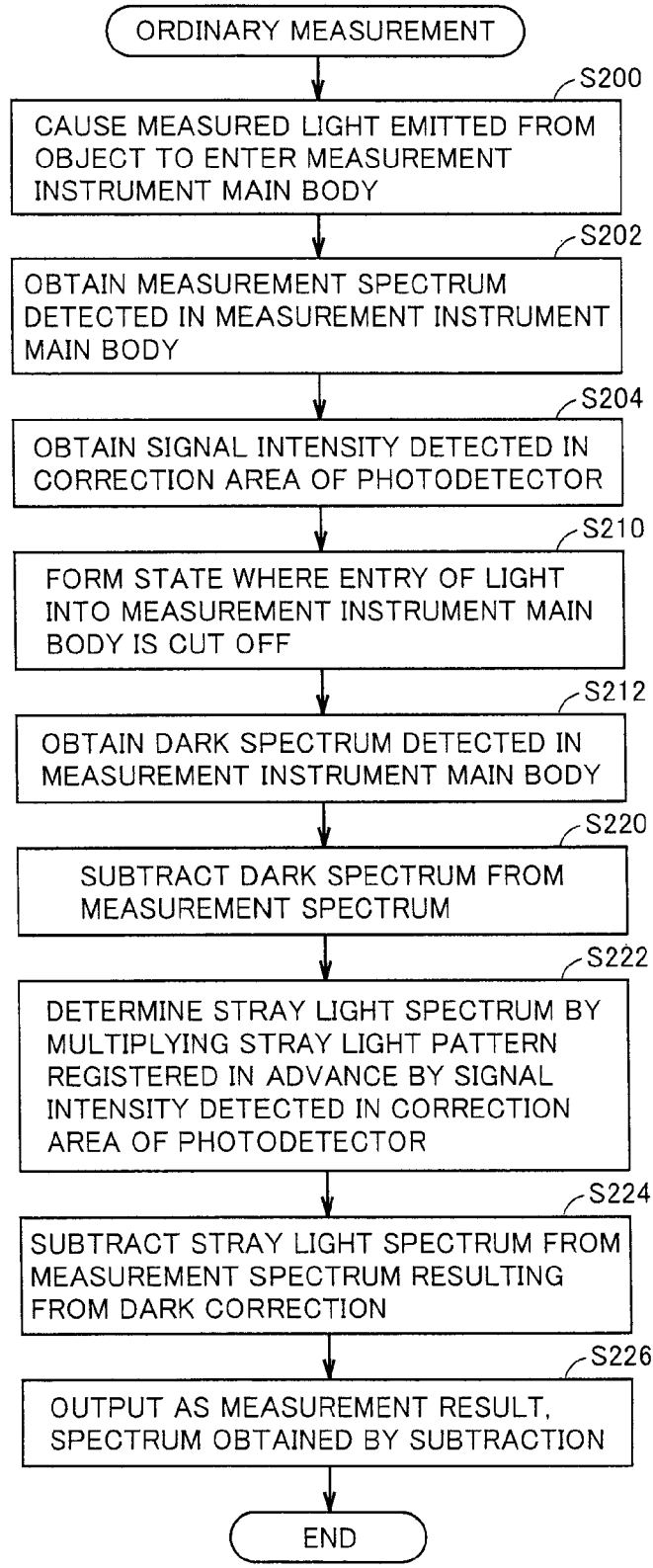
FIG. 10 is a flowchart showing a procedure involved with correction processing including dark correction and stray light correction during ordinary measurement according to the embodiment of the present invention.

FIG. 10 is a flowchart showing a procedure involved with correction processing including dark correction and stray light correction during ordinary measurement according to the embodiment of the present invention. Referring to FIG. 10, initially, processing for obtaining a measurement spectrum indicating measured light from an object shown in steps S200 to S204 is performed. Namely, the user connects light reception portion 6 to the object to cause the measured light emitted from the object to enter measurement instrument main body 2 through optical fiber 4 (step S200). Then, processing device 100 obtains the measurement spectrum detected in measurement instrument main body 2 (step S202).

In addition, processing device 100 obtains signal intensity detected in correction area 25b of photodetector 25 at the time when the measurement spectrum is obtained in step S202 (step S204). Signal intensity obtained in this step S204 is used in processing for generating a stray light spectrum which will be described later. Signal intensity obtained in step S204 is preferably an average value of a plurality of signal intensities detected in correction area 25b.

In succession, processing for obtaining a dark spectrum in steps S210 and S212 is performed. Namely, such a state that shutter 21 is driven to the close position and entry of light into measurement instrument main body 2 is cut off is formed (step S210). In this state, processing device 100 obtains the dark spectrum detected in measurement instrument main body 2 (step S212).

It is noted that any of the processing for obtaining a measurement spectrum shown in steps S200 to S204 described above and the processing for obtaining a dark spectrum shown in steps S210 to S212 may be performed first. In particular in such a case as continuously measuring a plurality of measurement targets while a temperature or the like is stable, such a method as utilizing a dark spectrum obtained at the time of first measurement in subsequent measurement can also be adopted. In this case, processing for obtaining a dark spectrum shown in steps S210 to S212 is preferably performed first.

In succession, correction processing shown in steps S220 to S226 is performed. Namely, processing device 100 subtracts the dark spectrum obtained in step S212 from the measurement spectrum obtained in step S202 (step S220). It is noted that this subtraction processing is performed in such a manner that subtraction between two components for each corresponding wavelength is carried out. Through this processing, a measurement spectrum resulting from dark correction is obtained.

In addition, processing device 100 determines a stray light spectrum by multiplying the stray light pattern registered in advance by the signal intensity obtained in step S204 and detected in correction area 25b of photodetector 25 (step S222). It is noted that any of the processing for obtaining a measurement spectrum resulting from dark correction shown in step S220 and the processing for determining a stray light spectrum shown in step S222 may be performed first. Alternatively, such processing may be performed in parallel.

In succession, processing device 100 subtracts the stray light spectrum obtained in step S222 from the measurement spectrum resulting from dark correction, that has been obtained in step S220 (step S224). It is noted that this subtraction processing is performed in such a manner that subtraction between two components for each corresponding wavelength is carried out. A spectrum obtained in this subtraction is output as a measurement result. Namely, processing device 100 outputs a spectrum obtained as a result of subtraction processing in step S224 as a measurement result of the spectral characteristics of the object (step S226).

Thus, the spectral characteristic measurement method according to the present embodiment includes the step of determining a spectrum indicating spectral characteristics of measured light by correcting, by using a pattern registered in advance (stray light pattern), a spectrum (measurement spectrum) detected when measured light enters the optical measurement instrument (measurement instrument main body 2). The step of determining a spectrum indicating spectral characteristics of this measured light includes the step of correcting the pattern (stray light pattern) based on signal intensity detected in correction area 25b of photodetector 25 and determining a spectrum indicating a measurement result of the spectral characteristics of the object by subtracting the corrected pattern (stray light spectrum) from the measurement spectrum.

<F. Control Structure>

Figure 11:
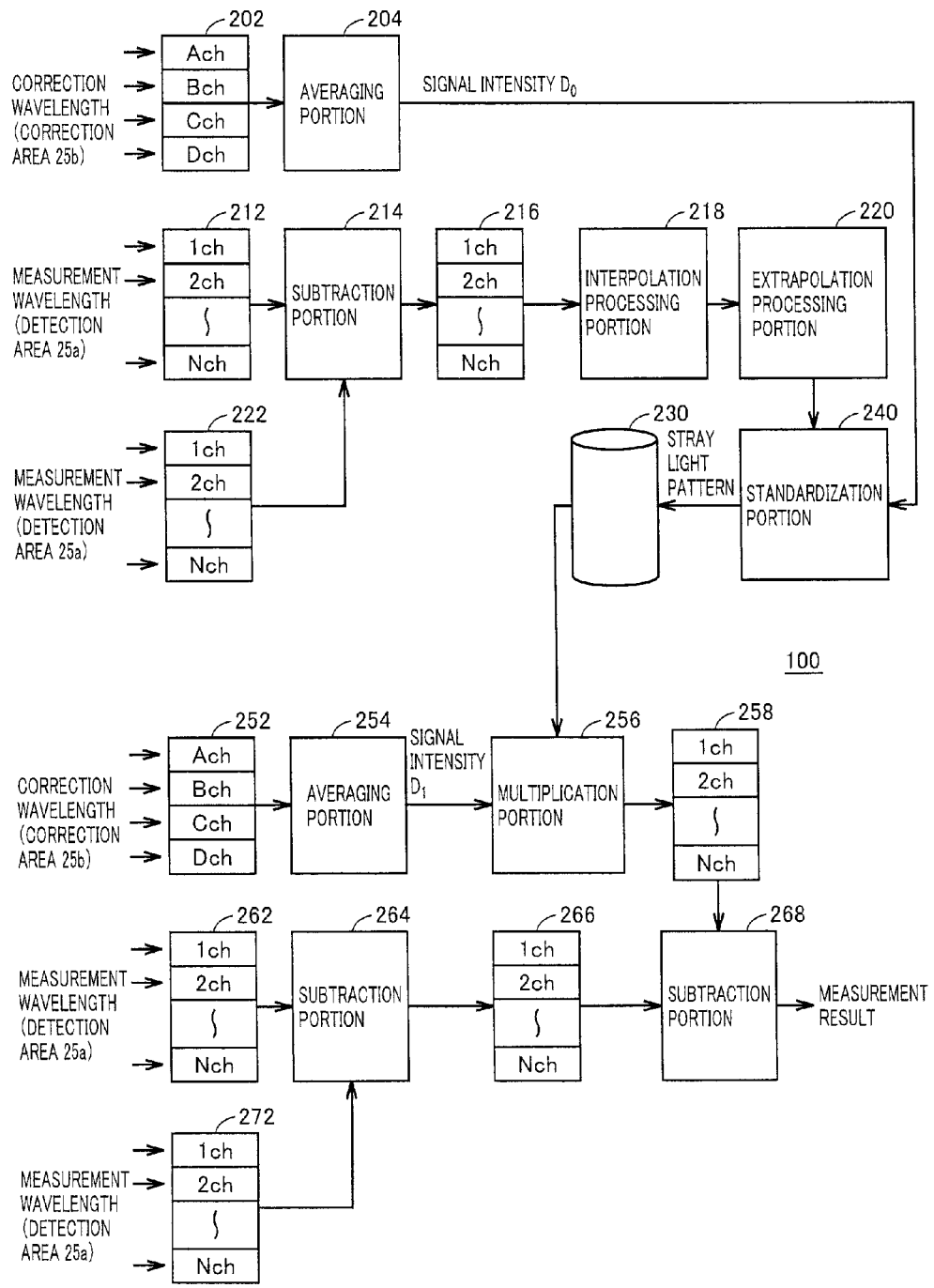
FIG. 11 is a schematic diagram showing a control structure in the processing device of the spectral characteristic measurement apparatus according to the embodiment of the present invention.

FIG. 11 is a schematic diagram showing a control structure in processing device 100 of spectral characteristic measurement apparatus 1 according to the embodiment of the present invention. Referring to FIG. 11, processing device 100 has a control structure for obtaining a stray light pattern and a control structure for calculating a measurement result. It is noted that the control structure for obtaining a stray light pattern does not necessarily have to be mounted on processing device 100 and it may be mounted on a different calibration device, because it is not necessary to frequently update the stray light pattern.

More specifically, processing device 100 includes buffers 202, 212, 216, 222, an averaging portion 204, a subtraction portion 214, an interpolation processing portion 218, an extrapolation processing portion 220, a standardization portion 240, and a storage portion 230, as the control structure for obtaining a stray light pattern. Meanwhile, processing device 100 includes storage portion 230, buffers 252, 258, 262, 266, 272, an averaging portion 254, a multiplication portion 256, and subtraction portions 264, 268, as a configuration for calculating a measurement result.

By way of example, FIG. 11 shows a control structure corresponding to a case where detection area 25a (FIG. 4) corresponding to a measurement wavelength range has N detection elements and correction area 25b corresponding to the measurement wavelength range has four detection elements.

A value detected in detection area 25a of photodetector 25 (signal intensity at each wavelength) is temporarily stored in buffer 212, 222, 262, 272. In addition, a value detected in correction area 25b of photodetector 25 (signal intensity) is temporarily stored in buffer 202, 252. It is noted that a buffer where a value is to be stored is selected as appropriate in accordance with each situation as described above and then measurement data is stored therein.

Each of buffers 212, 222, 262, 272 has at least N partitioned areas (1ch, 2ch, . . . , Nch) corresponding in number to the detection elements included in detection area 25a. Moreover, each of buffers 202, 252 has at least four partitioned areas (Ach, Bch, Cch, Dch) corresponding in number to the detection elements included in correction area 25b. Data stored in these buffers is sequentially updated every detection cycle (for example, several msec. to several ten msec.) of photodetector 25. Further, a channel (ch) is brought in correspondence with a wavelength detected by photodetector 25.

Buffer 202 stores signal intensity detected by each detection element constituting correction area 25b in obtaining a stray light pattern. Averaging portion 204 calculates signal intensity (signal intensity $D_0$ shown in FIG. 7) by averaging these signal intensities.

Buffer 212 stores a measurement spectrum (measurement spectrum 301 shown in FIG. 7) in obtaining a stray light pattern, and buffer 222 stores a dark spectrum (dark spectrum 302 shown in FIG. 7) in obtaining a stray light pattern.

Subtraction portion 214 calculates a difference between the measurement spectrum stored in buffer 212 and the dark spectrum stored in buffer 222. Namely, subtraction portion 214 carries out dark correction when a stray light pattern is obtained. A measurement spectrum representing the difference calculated by this subtraction portion 214 (spectrum 303 resulting from dark correction shown in FIG. 7) is stored in buffer 216.

Interpolation processing portion 218 subjects the spectrum stored in buffer 216 to interpolation processing, to thereby obtain characteristic information (wavelength-signal intensity characteristics). More specifically, interpolation processing portion 218 performs fitting processing by using a value of each component stored in buffer 216 and determines an approximate function. Extrapolation processing portion 220 subjects the characteristic information (the approximate function) determined by interpolation processing portion 218 to extrapolation processing and determines a stray light spectrum over a wavelength range from $f_{min}$ to $f_{max}$ for which measurement instrument main body 2 has detection sensitivity.

Further, standardization portion 240 standardizes the stray light spectrum determined by extrapolation processing portion 220, by using signal intensity $D_0$ calculated by averaging portion 204. As a result of this standardization processing, the stray light pattern is calculated. This calculated stray light pattern is stored in storage portion 230. Namely, storage portion 230 functions as storage means for storing a pattern indicating a stray light component (a stray light pattern) generated in optical measurement means (measurement instrument main body 2). Here, the pattern is any of the approximate function determined based on the characteristic information indicating the stray light component obtained with regard to a range other than the second wavelength range (from $f_{cut}$ to $f_{max}$) which is a part of the first wavelength range (the wavelength range from to $f_{max}$) and a data set indicating the approximate function. Such a data structure will be described later with reference to FIGS. 12A to 12D.

A configuration for calculating a measurement result will now be described.

Buffer 252 stores signal intensity detected by each detection element constituting correction area 25b during ordinary measurement. Averaging portion 254 calculates signal intensity (signal intensity $D_1$ shown in FIG. 9) by averaging these signal intensities.

Buffer 262 stores a measurement spectrum (measurement spectrum 311 shown in FIG. 9) during ordinary measurement, and buffer 272 stores a dark spectrum (dark spectrum 312 shown in FIG. 9) during ordinary measurement.

Subtraction portion 264 calculates a difference between the measurement spectrum stored in buffer 262 and the dark spectrum stored in buffer 272. Namely, subtraction portion 264 carries out dark correction during ordinary measurement. The measurement spectrum representing the difference calculated by this subtraction portion 264 (spectrum 313 resulting from dark correction shown in FIG. 9) is stored in buffer 266.

Multiplication portion 256 reads the stray light pattern stored in storage portion 230 and calculates a stray light spectrum (stray light spectrum 314 shown in FIG. 9) during ordinary measurement by multiplying the stray light pattern by signal intensity $D_1$ calculated in averaging portion 254. This calculated stray light spectrum is stored in buffer 258.

Subtraction portion 268 calculates a difference between the measurement spectrum resulting from dark correction, that is stored in buffer 266, and the stray light spectrum stored in buffer 258. Namely, subtraction portion 268 carries out stray light correction during ordinary measurement. The measurement spectrum representing the difference calculated by this subtraction portion 268 (spectrum 315 resulting from dark correction shown in FIG. 9) is output as a measurement result.

<G. Data Structure>

As described above, the reason why stray light correction is carried out by using the stray light pattern of which amplitude has been standardized is for correcting a difference between a situation at the time of obtaining a stray light pattern and a situation during ordinary measurement, by using signal intensity detected in correction area 25b of photodetector 25. It is noted that other methods can also be adopted for correction for reflecting variation in such a situation. Accordingly, various schemes as shown below can be adopted also for a structure of data stored as stray light pattern 107b (FIG. 6).

FIGS. 12A to 12D are each a schematic diagram showing one example of a data structure of a stray light pattern stored in spectral characteristic measurement apparatus 1. A data structure shown in each of FIGS. 12A to 12D will be described below.

FIG. 12A shows an example of a data structure in a case where the stray light pattern described above is stored as a standardized value. In this example, a standardized value of each component is stored in number as many as the number of detection elements included in detection area 25a of photodetector 25. In this example, the stray light spectrum can be determined (or estimated) with the method described above.

FIG. 12B shows a form in which a stray light spectrum (resulting from dark correction) measured at the time of obtaining the stray light pattern described above is stored in association with signal intensity detected in correction area 25b of photodetector 25 at that time. In this example, an amplitude of a component of the stray light pattern has not been standardized but remains as a measured value. In a case where this data structure is used to carry out stray light correction, the signal intensity detected in correction area 25b of photodetector 25 during ordinary measurement is used to correct the amplitude of the stray light spectrum. More specifically, each component value of the stray light spectrum is multiplied by a ratio of an absolute value of the signal intensity measured during ordinary measurement to an absolute value of the signal intensity measured in obtaining the stray light pattern, to thereby determine (or estimate) astray light pattern in accordance with a situation of ordinary measurement.

FIGS. 12C and 12D each show such a form that an approximate function obtained as a result of interpolation processing described above is stored as it is, rather than a value of each component of the stray light pattern. FIG. 12C shows an example where the approximate function is stored in a standardized state, and FIG. 12D shows an example where the approximate function reflecting an amplitude of an actually measured spectrum is stored in association with corresponding signal intensity, as in FIG. 12B.

By mounting the approximate function indicating such a stray light component on processing device 100, an amount of data can be reduced. At the time of stray light correction, by calculating at any time an amplitude corresponding to each wavelength by using the approximate function, stray light can be corrected by using processing the same as described above.

<H. Measurement Example>

A measurement result obtained by actually performing the processing according to the present embodiment will now be shown below.

Figure 13:
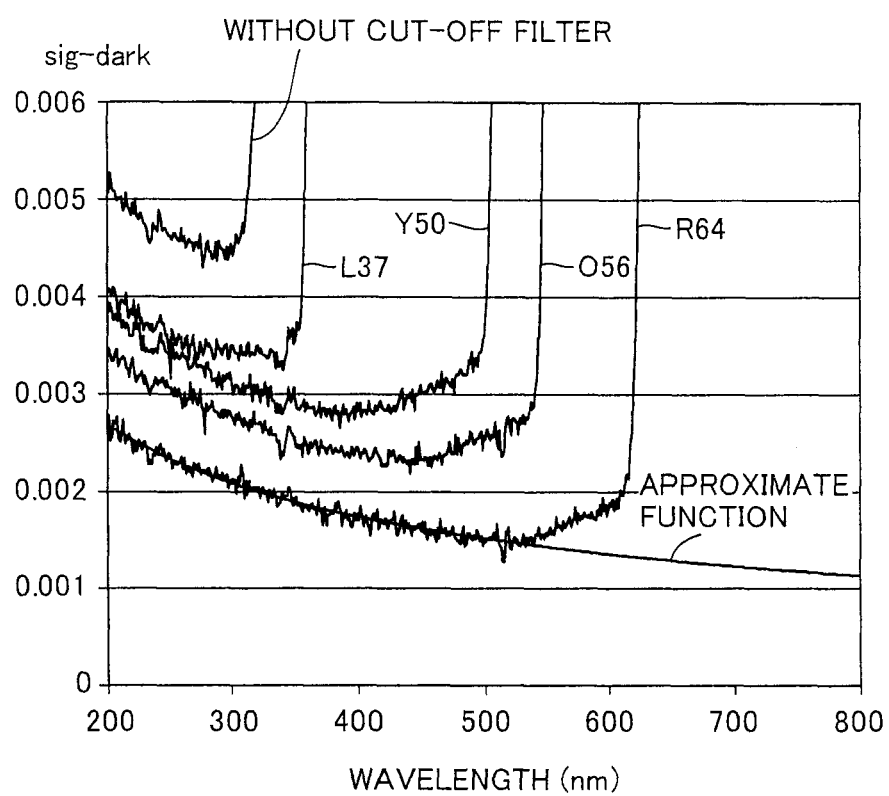
FIG. 13 shows an example of measurement with regard to a cut-off filter and stray light characteristics.

FIG. 13 shows an example of measurement with regard to a cut-off filter and stray light characteristics. In the measurement example shown in FIG. 13, a halogen lamp was adopted as a light source and four types of cut-off filter 31 (FIG. 2) below were tested. For comparison, a case where cut-off filter 31 is not provided (light as it is from the light source) is also shown.

(1) Cut-off wavelength: 370 nm (Type: L37)
(2) Cut-off wavelength: 500 nm (Type: Y50)
(3) Cut-off wavelength: 560 nm (Type: O56)
(4) Cut-off wavelength: 640 nm (Type: R64)

It is noted that an exposure time period was set to 5 msec., and FIG. 13 shows a spectrum resulting from dark correction.

In addition, a result obtained after a spectrum obtained in a case where a filter (type: R64) having a cut-off wavelength of approximately 640 nm was employed was subjected to interpolation processing and extrapolation processing is also shown.

Initially, as shown in FIG. 13, it can be seen that, with any cut-off filter, stray light has similar wavelength characteristics. Namely, it can be seen that, as a wavelength is higher, a stray light component thereof becomes less, which therefore basically means that a stray light pattern can be obtained with any cut-off filter.

The reason why an amplitude of stray light is different depending on a type of a cut-off filter is because a quantity of light that enters measurement instrument main body 2 is not equal. Namely, as a wavelength width across which entry of light is cut off is greater, a quantity of light decreases and hence an amplitude is smaller. In spectral characteristic measurement apparatus 1, however, an amplitude of the stray light spectrum is determined by using signal intensity detected in correction area 25b of photodetector 25 as described above, and therefore stray light correction is carried out with such fluctuation in amplitude being reflected.

In addition, as shown in FIG. 13, it can be seen that an approximate function (an exponential function) very high in correlation with wavelength characteristics of actually measured stray light is obtained, which means that, according to the present embodiment, not only stray light characteristics in a wavelength range where intensity is zero owing to the presence of a cut-off filter but also stray light characteristics in a wavelength range other than that can be corrected with high accuracy.

An example in which the inventors of the present application measured temperature dependency of stray light will now be shown.

FIGS. 14A, 14B, 15A, 15B, 16A, 16B, and 17 each show an example of measurement of temperature dependency of stray light. More specifically, in FIGS. 14A and 14B, FIGS. 15A and 15B, and FIGS. 16A and 16B, stray light was measured in such a state that measurement instrument main body 2 was placed in a thermostatic layer set to 10° C., 20° C., or 30° C. It is noted that the following two filters were used as the cut-off filter below.

(1) Cut-off wavelength: 380 nm (Type: L38)
(2) Cut-off wavelength: 520 nm (Type: Y52)

Figure 14A:
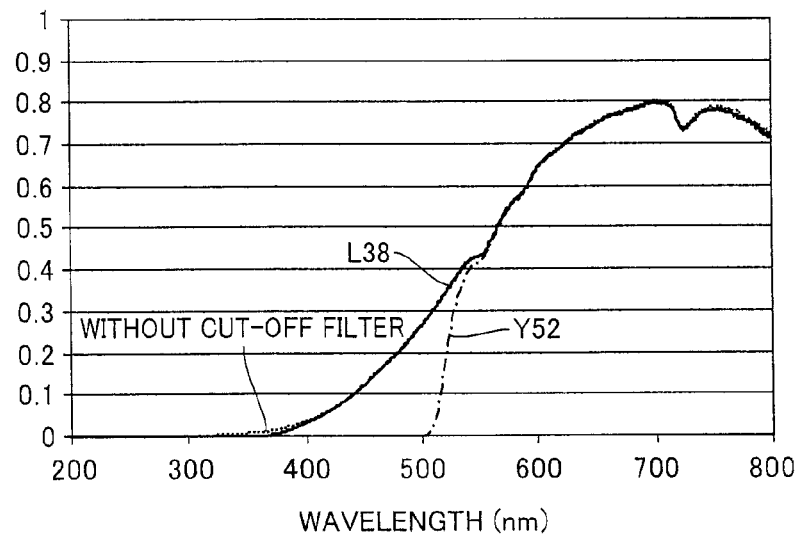
FIGS. 14A and 14B, 15A and 15B, 16A and 16B, and 17 each show an example of measurement of temperature dependency of stray light.
Figure 14B:
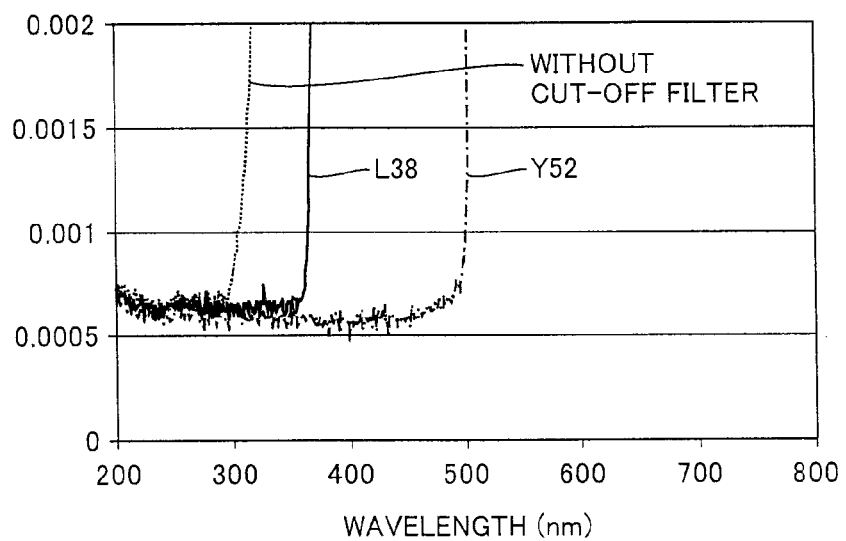
Figure 15A:
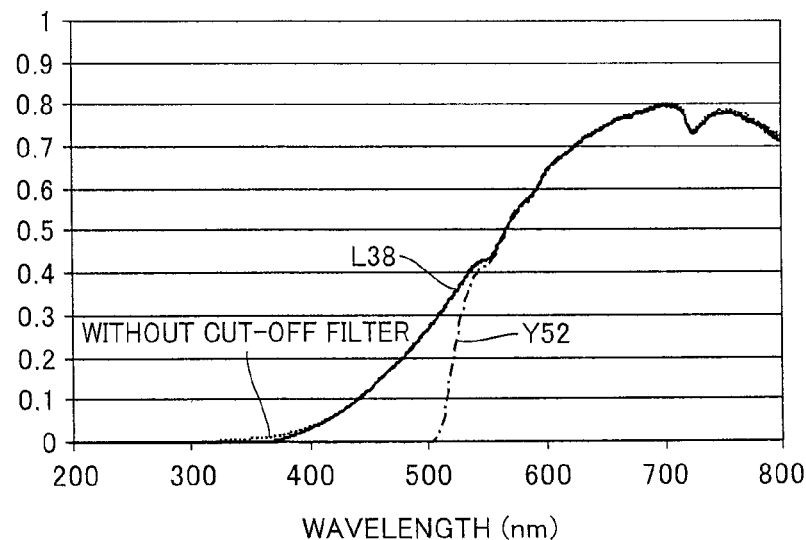
Figure 15B:
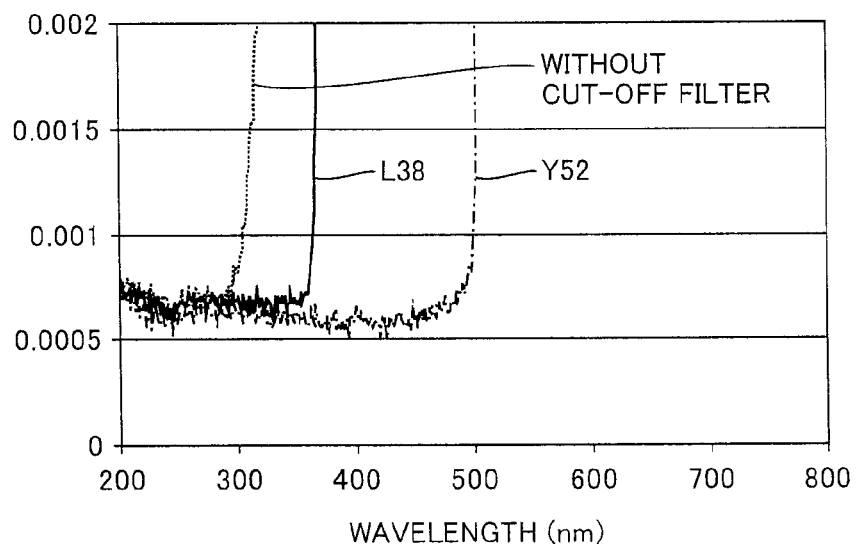
Figure 16A:
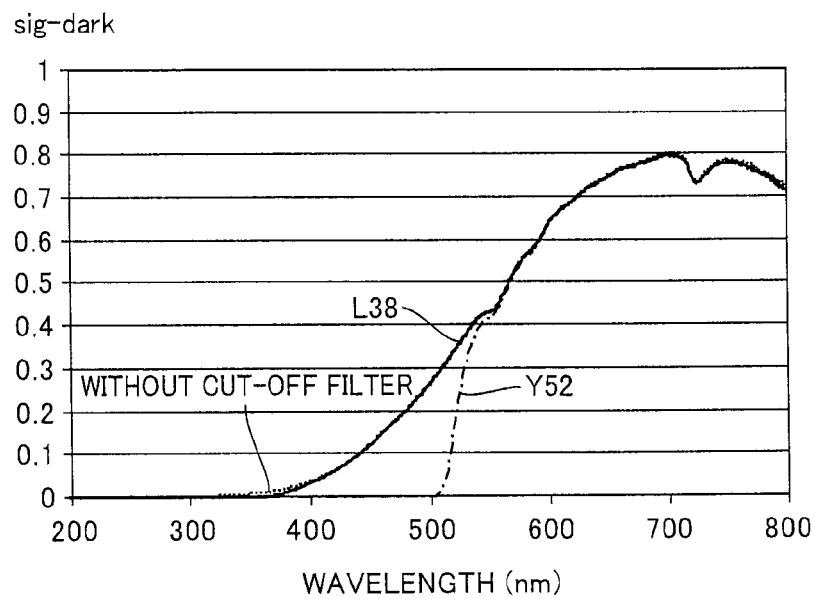
Figure 16B:
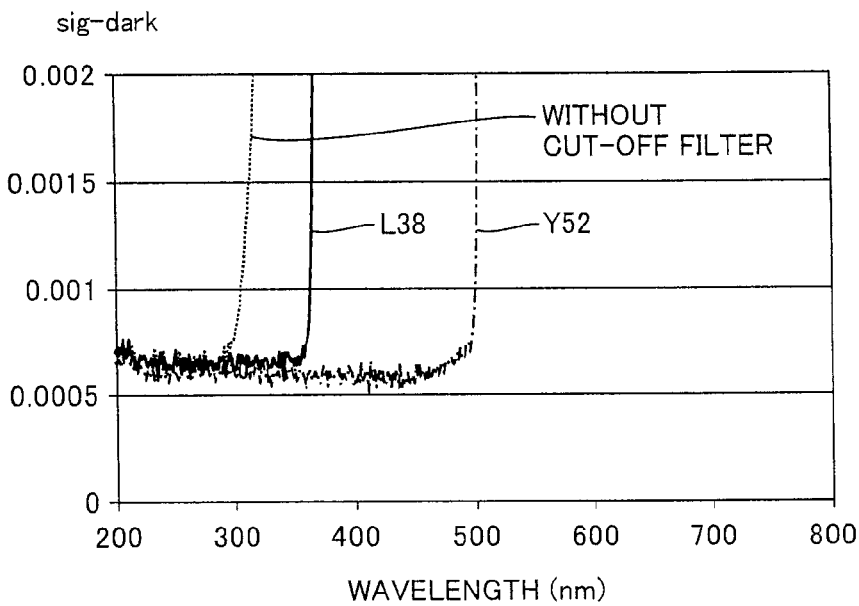
Figure 17:
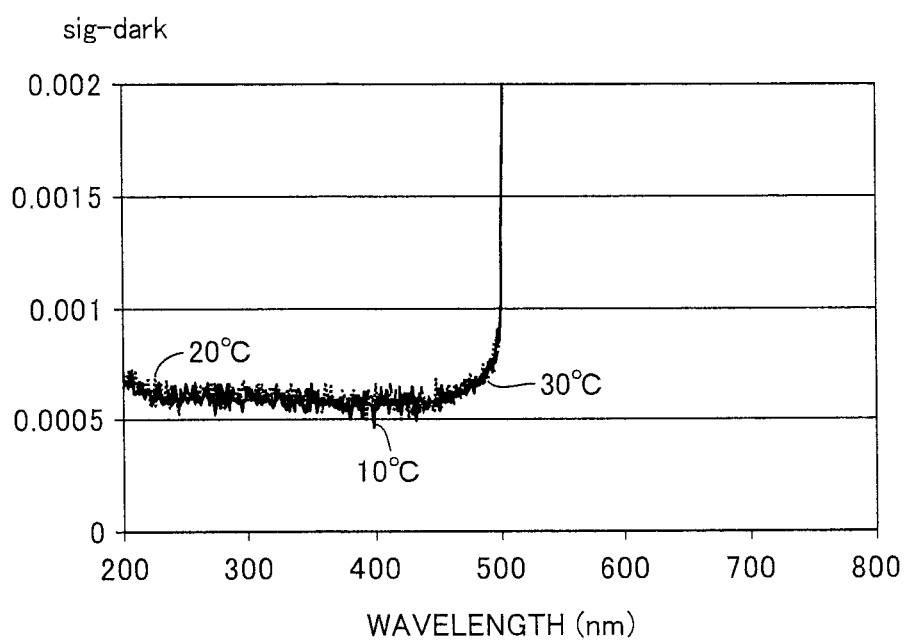

FIGS. 14A, 15A, and 16A show measurement results (spectra resulting from dark correction) at respective temperatures, and FIGS. 14B, 15B, and 16B show enlarged views of the spectra shown in FIGS. 14A, 15A, and 16A, respectively. Further, in FIG. 17, spectra in a case of using a cut-off filter (a cut-off wavelength: 520 nm/type: Y52) common to temperatures shown in FIGS. 14A, 14B, 15A, 15B, 16A, and 16B are plotted in a common wavelength-amplitude coordinate.

According to the measurement examples shown in FIGS. 14A, 14B, 15A, 15B, 16A, 16B, and 17, it is considered that stray light wavelength characteristics are low in temperature dependency and it is basically unnecessary to carry out temperature correction. Naturally, depending on a configuration or the like of a device, detection sensitivity varies depending on a temperature in an environment. Therefore, in such a case, during a process for determining a stray light spectrum based on a stray light pattern, a temperature factor is preferably used for correction.

<I. Variation>

(i1: First Variation)

In the embodiment described above, an example where measurement instrument main body 2 and processing device 100 are implemented as independent devices respectively has been illustrated, however, these devices may be integrated.

(i2: Second Variation)

The program according to one embodiment of the present invention may invoke a necessary module from among program modules provided as a part of an operation system (OS) of the computer at prescribed timing in prescribed sequences and to cause the module to perform processing. In that case, the program itself does not include the module above but processing is performed in cooperation with the OS. Such a program not including a module may also be encompassed in the program according to the embodiment of the present invention.

The program according to one embodiment of the present invention may be provided in a manner incorporated in a part of another program. In that case as well, the program itself does not include a module included in another program above but processing is performed in cooperation with another program. Such a program incorporated in another program may also be encompassed in the program according to the embodiment of the present invention.

The functions implemented by the program according to the embodiment of the present invention may partially or entirely be implemented by dedicated hardware.

<J. Advantages>

According to the present embodiment, a stray light pattern indicating a stray light component that may be generated specifically in measurement instrument main body 2 is obtained in advance in spectral characteristic measurement apparatus 1, the stray light pattern obtained in advance is corrected in accordance with a situation at the time of each measurement (that is, a stray light spectrum is estimated), and then the stray light spectrum is subtracted from a measurement spectrum. Thus, spectral characteristics (spectrum) of an object to be measured from which influence of the stray light component has been excluded can be calculated. In addition, together with this stray light correction, influence of a dark current or the like that flows in a photodetector can be eliminated through dark correction. As a result of such correction, optical measurement of an object to be measured can be obtained with higher accuracy.

In addition, according to the present embodiment, an area where measured light is incident (detection area 25*a*) and an area where no measured light is incident (correction area 25*b*) are provided in a detection surface of photodetector 25, and signal intensity is detected in correction area 25*b* when a measurement spectrum is detected in detection area 25*a*. Then, a stray light spectrum is calculated by using this detected signal intensity. Therefore, such a mechanical operation as replacing a filter is not necessary and a stray light spectrum is calculated by using signal intensity detected along with detection of the measurement spectrum. Thus, a processing time period can be reduced. In other words, stray light correction and measurement with higher accuracy can be carried out while avoiding increase in processing time period.

Moreover, according to the present embodiment, since a stray light spectrum in accordance with a situation for each measurement is estimated, measurement with high accuracy can be conducted in a stable manner even in such a situation that an environment (for example, a temperature) significantly varies in a short period of time.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A spectral characteristic measurement method, comprising:
    preparing an optical measurement instrument having detection sensitivity in a first wavelength range;
    arranging a filter that cuts off light having a wavelength range other than a second wavelength range, the second wavelength range is a part of the first was range;
    obtaining characteristic information indicating a stray light component from a portion of the first wavelength range of the filtered light detected by the optical measurement instrument, that corresponds to a wavelength range other than the second wavelength range; and
    obtaining a pattern indicating a stray light component generated in the optical measurement instrument by subjecting the characteristic information to extrapolation processing, which expands the characteristic information from the first portion of the first wavelength range to the second wavelength range.

2. The spectral characteristic measurement method according to claim 1, further comprising determining a third spectrum indicating spectral characteristics of non-filtered light from a sample by correcting, using, the pattern, a second spectrum detected when the non-filtered light enters the optical measurement instrument.

3. The spectral characteristic measurement method according to claim 2, wherein
    the optical measurement instrument includes a photodetector for receiving incident and the photodetector has a detection surface constituted of a first detection area designed such that light in the first wavelength range is incident and a second detection area other than the first detection area,
    the spectral characteristic measurement method further comprises obtaining signal intensity detected in the second detection area in detecting the second spectrum, and
    the step of determining a third spectrum includes correcting the pattern based on the signal intensity and determining the third spectrum by subtracting the corrected pattern from the second spectrum.

4. The spectral characteristic measurement method according to claim 3, where in
    the second detection area is provided on a shorter wavelength side continuing from the first detection area.

5. The spectral characteristic measurement method according to: claim 3, wherein
    the second detection area includes a plurality of detection elements, and
    the signal intensity is an average value of signal intensities detected by the plurality of detection elements.

6. The spectral characteristic, measurement method according to claim 3, wherein
    the step of obtaining the pattern includes determining an exponential function for approximating the obtained characteristic information.

* * * * *